US007752070B2

(12) United States Patent
Hatcher et al.

(10) Patent No.: US 7,752,070 B2
(45) Date of Patent: Jul. 6, 2010

(54) ENTERPRISE INFORMATION EVOLUTION ANALYSIS SYSTEM

(75) Inventors: Donald Andrew Hatcher, Garner, NC (US); William Michael Prentice, Pittsboro, NC (US); Robert Allan Russell, Kenilworth (GB)

(73) Assignee: SAS Institute Inc., Cary, NC (US)

( * ) Notice: Subject to any disclaimer, the term of this patent is extended or adjusted under 35 U.S.C. 154(b) by 1341 days.

(21) Appl. No.: 10/310,106

(22) Filed: Dec. 4, 2002

(65) Prior Publication Data

US 2004/0093244 A1 May 13, 2004

Related U.S. Application Data

(60) Provisional application No. 60/425,510, filed on Nov. 12, 2002.

(51) Int. Cl.
*G06Q 10/00* (2006.01)
(52) U.S. Cl. .............................................. 705/11; 705/7
(58) Field of Classification Search ..................... 705/7, 705/11
See application file for complete search history.

(56) References Cited

U.S. PATENT DOCUMENTS

2004/0054545 A1* 3/2004 Knight ........................... 705/1

OTHER PUBLICATIONS

Harigopal and Satyadas, Cognizant Enterprise Maturity Model (CEMM), IEEE Transactions on Systems, Man, and Cybernetics-PartC: Applications and Reviews, vol. 31, No. 4, Nov. 2001.*

Pee et al., Development of a General Knowledge Management Maturity Model, School of Computing, National University, circa 2004.*

Clark and Jones, Organisational Interoperability Maturity Model for C2, 1999 Command and Control Research and Technology Symposium, Jun. 1999.*

Holland and Light, A Stage Maturity Model for Enterprise Resrouce Planning Systems Use, The Data Base for Advances in Information Systems—Spring 2001 (vol. 32, No. 2), p. 32-45.*

Curtis et al., People Capability Maturity Model, Carnegie Mellon Software Engineering Institute, 445 pg., Sep. 1995.*

Shapiro, Stages in the Evolution of the Product Development Process, and Shapiro and Gilmore, Implementing PACE: How to Make It Real and Make It Lasting, in Setting the PACE in Product Development: A Guide to Product and Cycle Time Excellence, 1995, p. 147-177.*

Gardner, Resolving the Process Paradox, Quality Progress. Milwaukee: Mar. 2001. vol. 34, Iss. 3; p. 51, 9 pgs.*

Kakita and Yu, Improving Process Maturity to Compete in the Desktop Printer Market, Apr. 1998 PDMA Visions Magazine, pp. 1-8.*

(Continued)

*Primary Examiner*—Beth V. Boswell
*Assistant Examiner*—Justin M Pats
(74) *Attorney, Agent, or Firm*—Jones Day

(57) ABSTRACT

A system and method are provided which analyze information management within enterprises and organizations from a perspective of evolutionary levels, or phases. Once an organization has been determined where it lies within the evolutionary levels, action items are used to transition proactively along the evolutionary path. The action items are selected so as to ease transition from one level or phase to the next.

11 Claims, 24 Drawing Sheets

OTHER PUBLICATIONS

Dresner et al., The Business Intelligence Competency Center: An Essential Business Strategy, Gartner Strategic Analysis Report, May 29, 2002.*

Bassi, Harnessing the Power of Intellectual Capital, Training & Development, Dec. 1997; vol. 51, No. 12, p. 25-30.*

Dodgsen and Hinze, Measuring Innovation, International Conference on "Measuring and Evaluating Industrial R&D and Innovation in the Knowledge-based Economy", Aug. 23-24, 2001, Taipei, R.O. C.*

Kotelnikov and Ten3 East-West, Business Development Stage: Maturity, www.1000ventures.com, retrieved from web.archive.bibalex.org, dated Oct. 10, 2002, p. 1-5.*

Kotelnikov, Business Development Stage: Expansion, www.1000ventures.com, retrieved from web.archive.bibalex.org, dated Aug. 6, 2002.*

Kotelnikov, Business Development Stage: Growth, www.1000ventures.com, retrieved from web.archive.bibalex.org, Aug. 6, 2002.*

Kotelnikov, Building Strategic Alliances, www.1000ventures.com, retrieved from web.archive.bibalex.org, dated Oct. 7, 2002.*

Joint Ventures, www.1000ventures.com, retrieved from web.archive.bibalex.org, dated Oct. 7, 2002.*

World Intellectual Property Organisation (WIPO), Licensing of IPR—a Vital Component of the Business Strategy of Your SME, www.1000ventures.com, retrieved from web.archive.bibalex.org, dated Jun. 6, 2002.*

Mergers & Acquisitions, www.1000ventures.com, retrieved from web.archive.bibalex.org, dated Oct. 7, 2002.*

Kotelnikov and Ten3 East-West, Strategic Innovation: Road-mapping, www.1000ventures.com, retrieved from web.archive.bibalex.org, dated Oct. 19, 2002.*

Kotelnikov, Systemic Innovation, 1000ventures.com, retrieved from web.archive.bibalex.org, Aug. 6, 2002, p. 1-3.*

Carnegie Mellon, Capability Maturity Model Integration (CMMI), Version 1.1, Mar. 2002, p. 1-711.*

Davis, Jim et al., "Information Revolution: Using the Information Evolution Model to Grow Your Business", John Wiley & Sons, Inc., 2006, pp. 1-195.

Dresner, H. et al., "The Business Intelligence Competency Center: An Essential Business Strategy", Strategic Analysis Report, May 29, 2002, pp. 1-36.

Gladwell, Malcolm, "The Talent Myth: Are Smart People Overrated?", The New Yorker, Jul. 22, 2002 (2 pp.). [http://www.newyorker.com/archive/2002/07/22/2002fa_fact].

Hammer, Michael et al., "Reengineering the Corporation: A Manifesto for Business Revolution", First Edition, HarperBusiness, 1993, pp. 1-223.

* cited by examiner

US 7,752,070 B2

ENTERPRISE INFORMATION EVOLUTION ANALYSIS SYSTEM

CROSS-REFERENCE TO RELATED APPLICATION

This application claims priority to U.S. provisional application (entitled "Enterprise Information Evolution Analysis System And Method", Ser. No. 60/425,510, filed Nov. 12, 2002). By this reference, the full disclosure, including the drawings, of said U.S. provisional application is incorporated herein.

TECHNICAL FIELD

The present invention relates generally to analysis systems and methods for organizations, and more particularly to information utilization analytical systems and methods for organizations.

BACKGROUND

"It is not necessary to change. Survival is not mandatory," warned W. Edward Deming, the world-renown expert on corporate performance and quality. When these words were written in the 1980's, the business world was being turned upside-down by customer demands for better service, higher quality goods, and lower prices. The manufacturing era, when products could be sold as quickly as they could be produced, was coming to an end. Consumers were becoming selective, and were quickly becoming more informed than they had ever been. Personal computing was growing, and information was beginning to drive the marketplace. Forward thinking companies were beginning to realize that there was significant hidden value in the information accrued during their normal course of business. Deming's words were to be a warning shot across the bow of companies captained by leaders who thought they could continue to run their business as they always had.

Now, fifteen years later and well into the information age, change is endemic and inevitable. And one of the most obvious changes is the way information is generated, analyzed, and consumed by businesses today. What was once simply a by-product of "production" work, information has become critical to the success of today's company. And managing that information has become an industry of its own. Information has become of such strategic value that, for many companies, it has replaced hard goods as the product of their efforts, and as the source of their revenue stream. Time Warner, for example, once generated income strictly by producing magazines (Time, Life) and movies (Warner Brothers). Now, as AOL/Time Warner, it is clearly focused on moving to complete digital delivery of entertainment, news, and other information through the America Online interface. Where they were once focused on turning paper, ink, and celluloid into magazines and movies, they are now focused on creating and distributing information as interactive web content or streaming video. Sure, they still produce magazines, but their future is presently viewed to be in electronic content (i.e., information) creation and delivery.

So how does a company manage its strategic information assets in today's rapidly changing business environment? And what challenges arise out of that task? Are there any preventive measures that can be taken to ease the "growing pains" associated with moving from one information paradigm to the next?

SUMMARY

The present invention addresses these questions and others in relation to having an enterprise or organization become an information-driven organization. In accordance with the teachings provided herein, a system and method are provided which analyze information management within enterprises and organizations from a perspective of evolutionary levels, or phases. Once an organization has been determined where it lies within the evolutionary levels, action items are used to transition proactively along the evolutionary path. The action items are selected so as to ease transition from one level or phase to the next.

DETAILED DESCRIPTION

Figure 1:
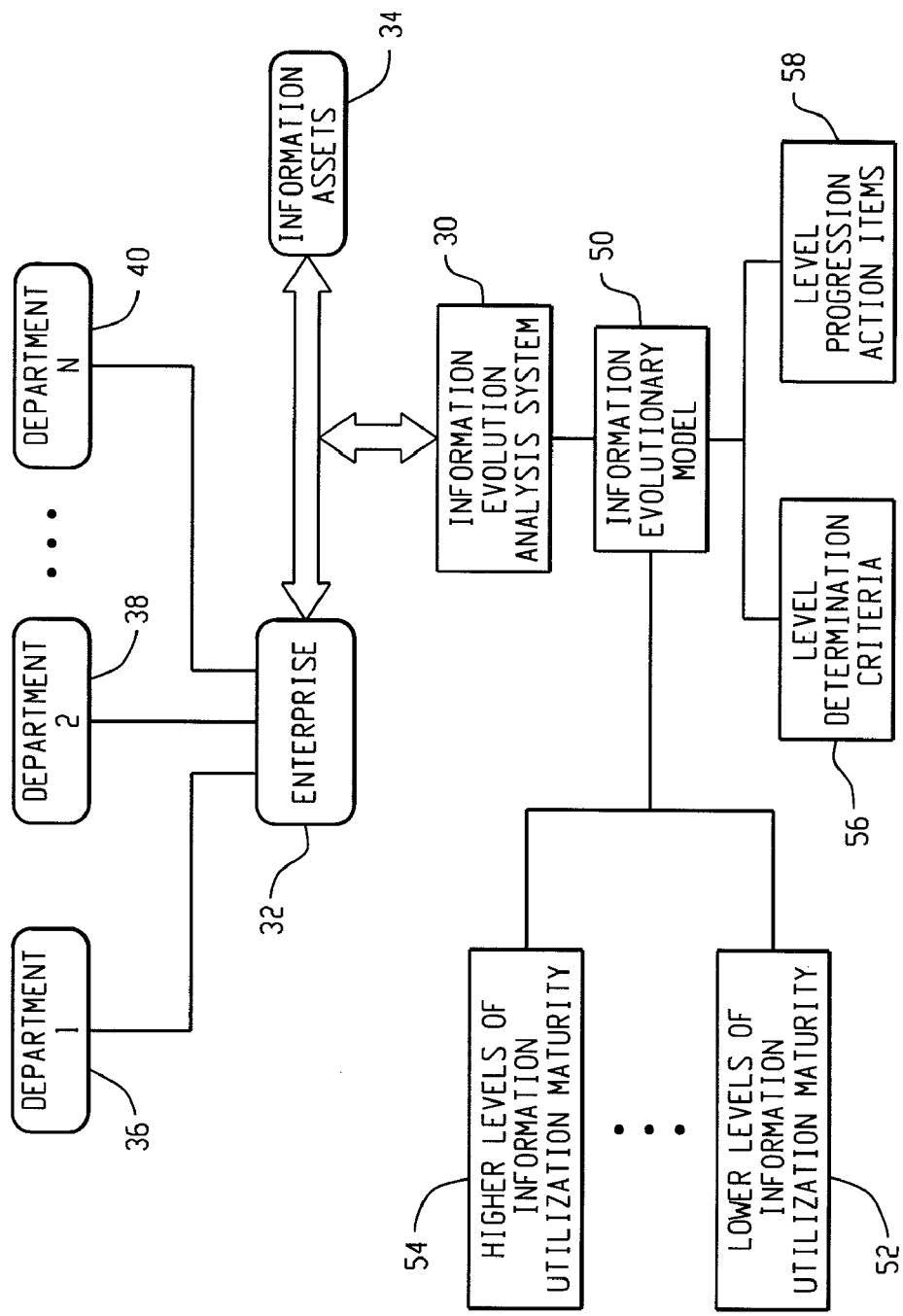
FIG. 1 is a block diagram depicting an information evolution analysis system which examines how an enterprise's departments utilize information assets.

FIG. 1 shows an information evolution analysis system 30 which examines how an enterprise 32 utilizes information assets 34 across its departments (36, 38, 40). The system 30 includes evolutionary levels (52, 54) that are indicative of increasing levels of information maturity for an enterprise 32.

The increasing levels (52, 54) of maturity represent improvements in the distribution and utilization of the information assets 43 across the departments (36, 38, 40) of the enterprise 32. The levels (52, 54) recognize that enterprises evolve through a number of phases.

Within the system 30, an information evolutionary model 50 is used to establish step-wise evolutionary levels (52, 54) where lower levels 52 consolidate and integrate information across an enterprise's departments in order to form a substantially integrated enterprise information environment. The integrated information reduces data disparity among the departments (36, 38, 40). The evolutionary model 50 includes higher levels 54 which use the integrated information to improve the enterprise, such as by aligning the enterprise to the needs of the market, optimizing the enterprise's internal processes and by instilling an environment of innovation for new services and products.

In evolving through the levels (52, 54), an enterprise's capabilities build cumulatively from one level to the next—thus each level includes and exceeds the previous ones. As this process is driven by business objectives, the actual implication of the model 50 on any particular organization will be unique to that organization's business focus. However, there will be similarities in issues and rewards as any enterprise evolves through the model 50. It should be understood that the terms "higher" and "lower" are relative terms and should be broadly construed. For example, integration of information assets across departments (e.g., interdepartmental integration) represents a higher level in the information evolutionary model 50 than a level which consolidates information assets within a department (e.g., intradepartmental consolidation).

The evolutionary model 50 includes level determination criteria 56 to assess at which information evolutionary level (52, 54) the enterprise 32 substantially belongs. The level determination criteria 56 may be based upon what entity controls the information assets 34 within the enterprise and/or how the information assets 34 is distributed across the enterprise's departments. Level progression action items 58 guide how the enterprise 32 may proceed from its current evolutionary information level to a higher level.

Figure 2:
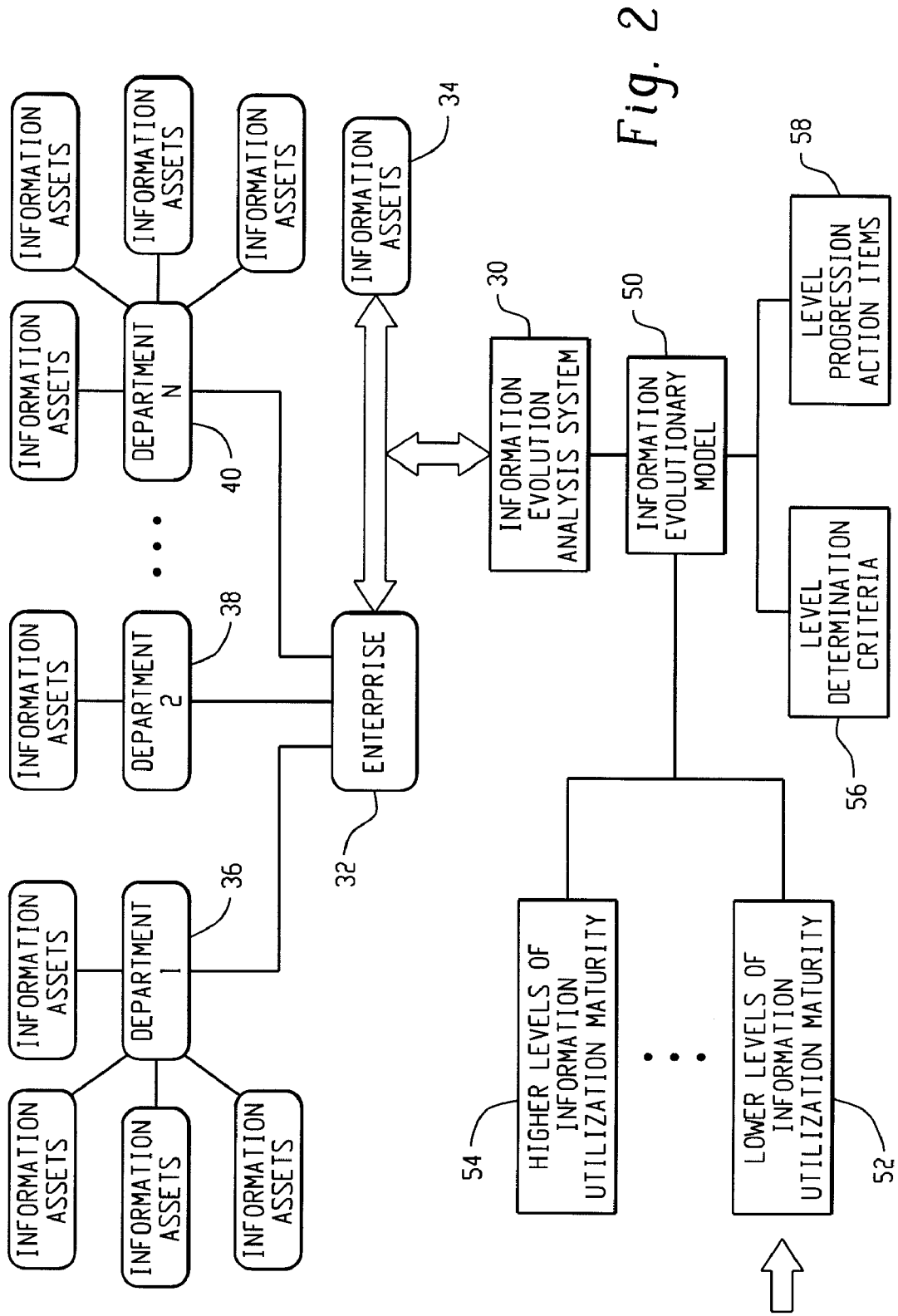
FIG. 2 is a block diagram depicting analysis of an enterprise which utilizes information assets at lower levels of information evolution.

FIG. 2 depicts analysis of an enterprise 32 which utilizes information assets 34 at lower levels 52 of information evolution. An enterprise 32 functioning at lower evolutionary levels 52 has departments (36, 38, 40) which have not consolidated utilization and distribution of information assets 34 within its own department (36, 38, 40) let alone across the entire enterprise 32.

Figure 3:
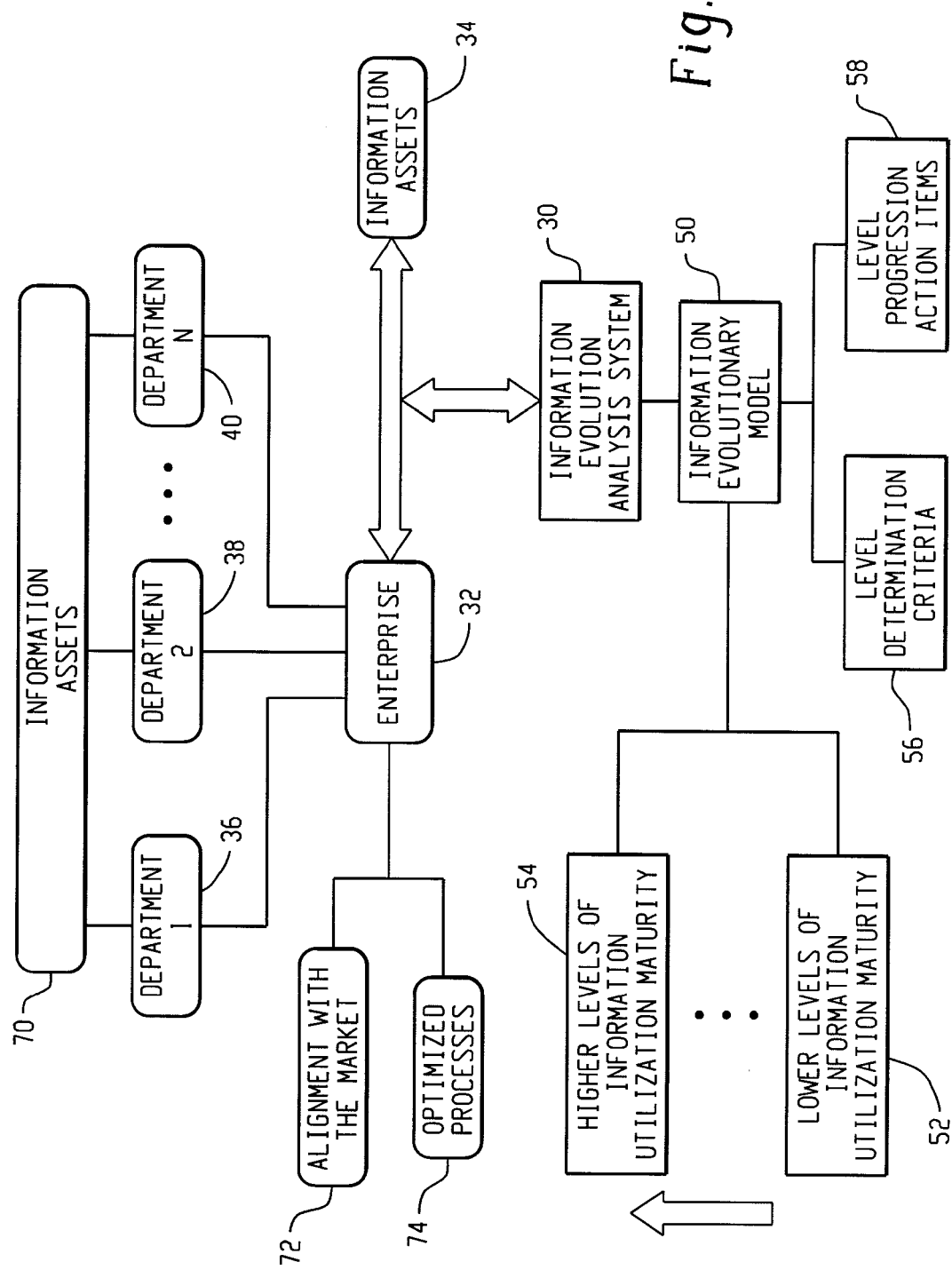
FIGS. 3 and 4 are block diagrams depicting analysis of an enterprise which utilizes information assets at higher levels of information evolution.
Figure 4:
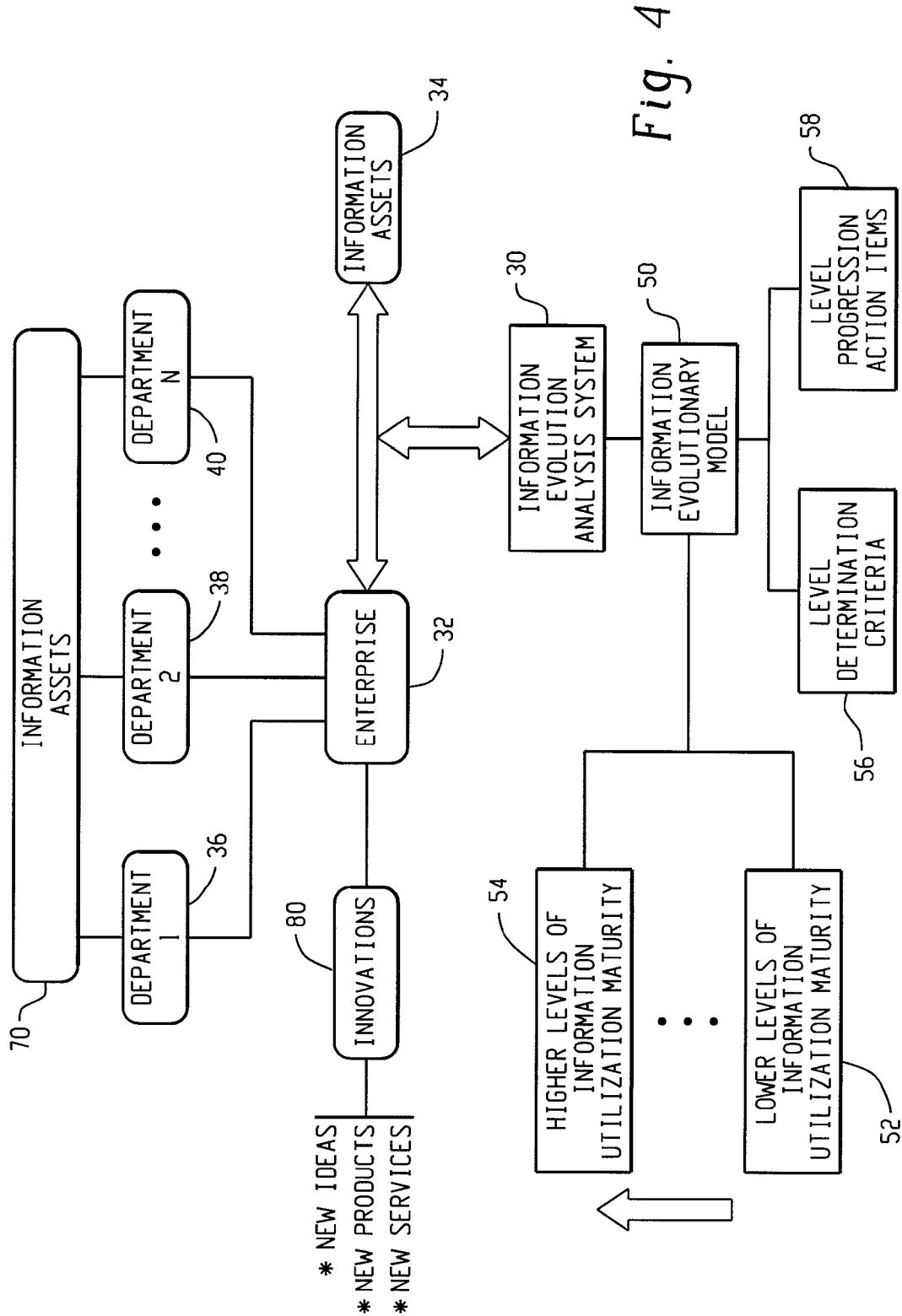

FIGS. 3 and 4 depict analysis of an enterprise 32 which utilizes information assets 34 at higher levels of information evolution 54. As an enterprise 32 evolves through the levels (52, 54), information assets 34 become integrated across the entire enterprise 32 as shown at 70. Instead of information assets 34 being "locked" within a department (36, 38, 40), the information assets 34 are free for utilization for people who need the information assets 34 irrespective of which department (36, 38, 40) they belong. Enterprises at higher levels experience less data inconsistencies or disparities across departments. As an example, the enterprise's sales people will be drawing from the same pool of financial data definitions and information as their marketing counterparts. Thus, reports to the enterprise's management regarding revenue numbers will be using the same vocabulary, terminology and data. A lingua franca for the enterprise has thereby been established.

A maturing enterprise 32 has greater knowledge of itself through its integrated information assets 70 and can use the integrated information assets 70 to achieve better alignment 72 with the needs of the market. After an improved alignment 72, the thorough knowledge of the internal workings of the enterprise 32 gained through the integrated information assets 70 may be further utilized to perform optimizations 74 of the enterprise's processes. Still further, a higher level enterprise 32 may use the integrated information assets 40 to create innovations 80 so that new products and services are brought to market. This allows an enterprise 32 to reengineer itself and create new value for its products, services and shareholders. Accordingly, an enterprise 32 at higher levels 54 knows what information is needed by the business, and makes it readily available across the enterprise 32 for consumption.

It should be understood that the information evolution analysis system 30 provides a flexible analytical framework and may be used in many situations. Thus, the framework may be used for diverse structures and organizations, such as enterprises, profit and non-profit organizations, partnerships, corporations, companies, company subsidiaries, company divisions, etc. Typically, the framework may be used for any organization having multiple departments. The term department is also broad as it entails units of an organization. The units may be determined by a number of factors, such as geography or function.

Similarly, the term "information assets" is broad as it includes any and all types of intangible assets of the organization. This recognizes that the value of a corporation today is often reflected more by the value of intangible assets than by tangible ones. For example, companies may certainly own tangible assets like buildings, office equipment, and other trappings of a modern-day services business. But their true value is in information. They own their supplier and customer relationships, and conduct primary research with customers to determine viewing requirements. These requirements, in turn, drive the production of shows that meet their customer's needs.

Figure 5:
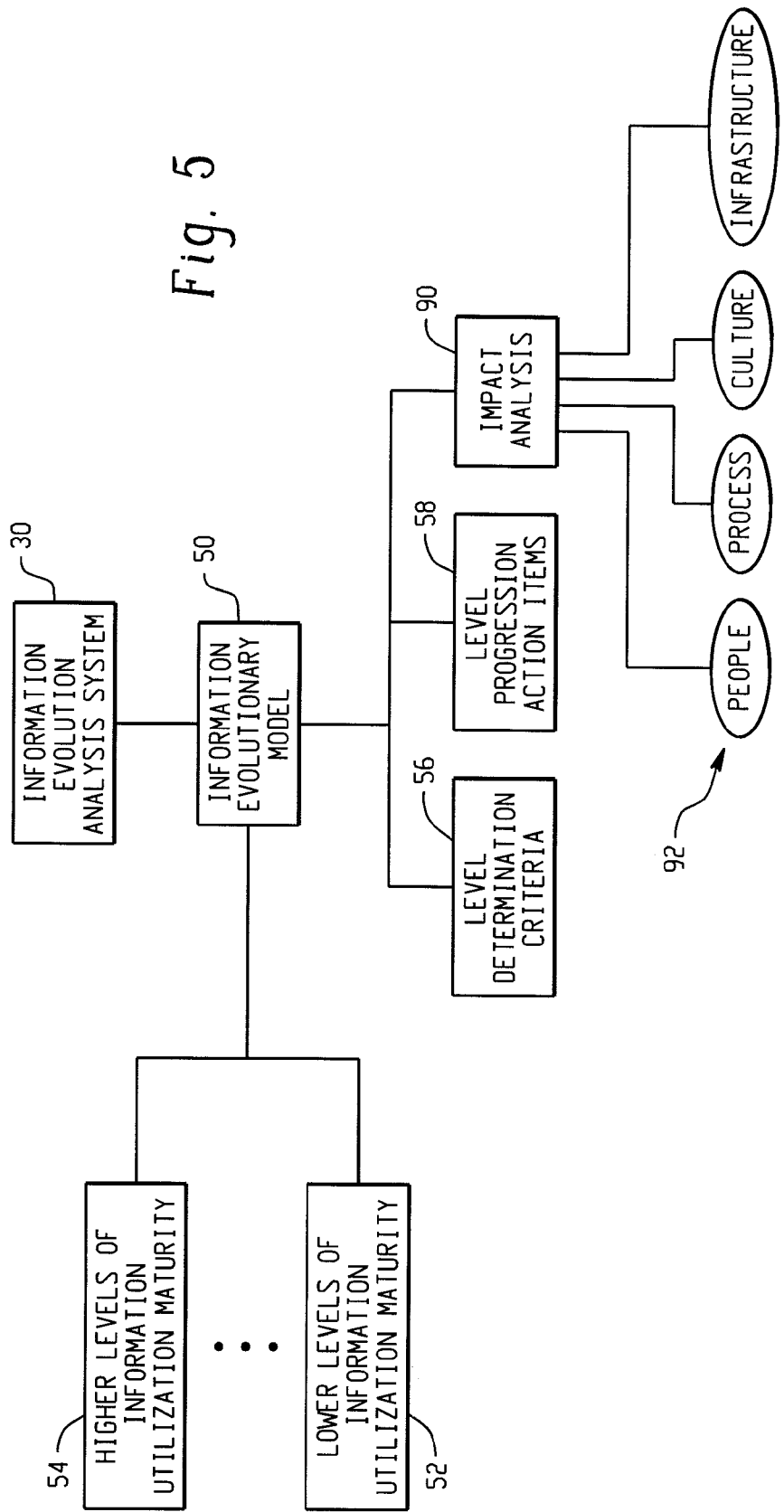
FIGS. 5 and 6 are block diagrams depicting impact analysis within an information evolution analysis system.

To help the enterprise evolve in its information maturity, the information evolutionary model 50 allows for impact analysis 90 upon various enterprise constituencies 92. As shown in FIG. 5, the information evolutionary model 50 examines the use of information and the evolutionary process in terms of their impact on:

People—Who is involved in the use of information?
Process—What information-related activities are to be performed?
Culture—How do things get done in the information environment?
Infrastructure—What information-related technology, tools, policies and governance need to be in place?

The information evolutionary model 50 examines at which levels (52, 54) the constituencies 92 of the enterprise substantially reside. The level of maturity in an enterprise may be judged by the lowest of these four dimensions; that is, a company at a higher information evolutionary level (e.g., level 4) in terms of people, process and culture, but at a lower information evolutionary level (e.g., level 2) in infrastructure will behave as a company at the lower information evolutionary level (e.g., level 2) until the infrastructure is upgraded. The weakest link limits the effectiveness of the environment. Failure to having the constituencies aligned costs the enterprise. Accordingly, analysts using the information evolutionary system 30 may have wish to have alignment across all constituencies before progressing the levels of those constituencies which are at higher levels than others.

Figure 6:
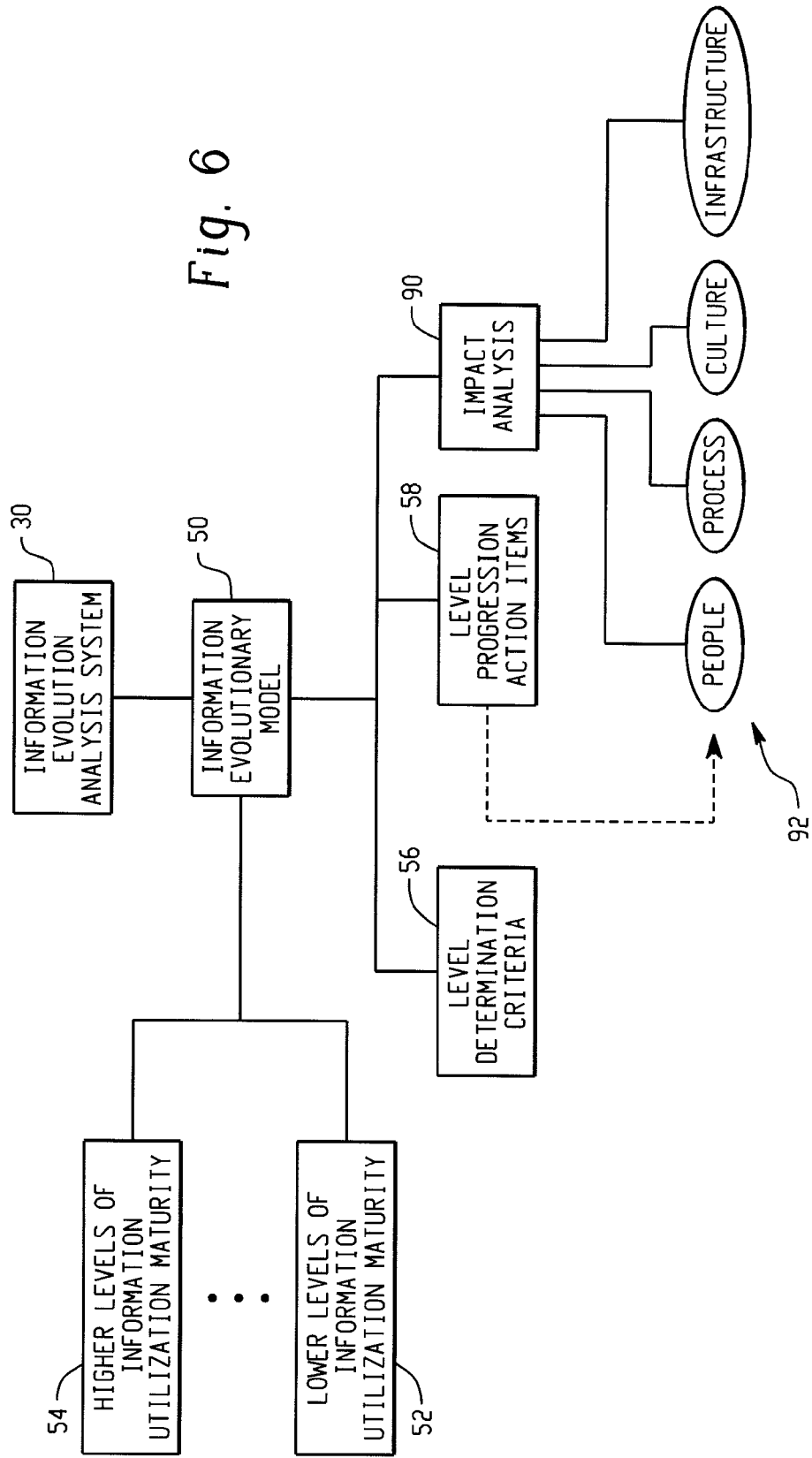

As shown in FIG. 6, each of the four dimensions is associated with level progression action items 58. The level progression action items 58 identify what steps are needed for a particular dimension to progress to the next level.

Figure 7A:
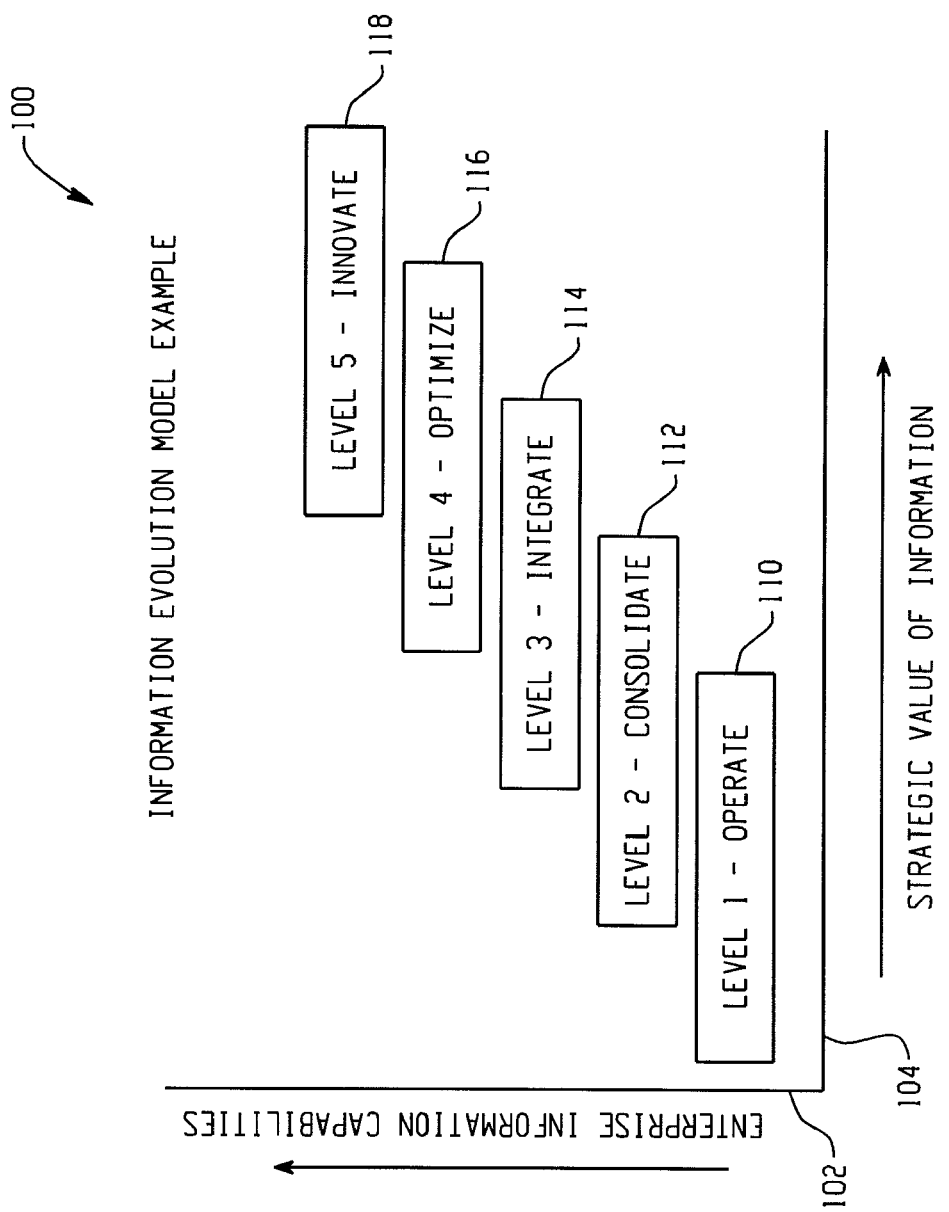
FIG. 7A is a graph depicting interrelationships between enterprise information capabilities and strategic value of information for the information evolution model.

FIG. 7A is a graph 100 depicting interrelationships between enterprise information capabilities 102 and strategic value of information 104 for the information evolution model. The progression of an enterprise from lower levels to higher levels reflects not only a heightened strategic value of information within the enterprise, but also a continual increase in information capabilities for the enterprise. As an illustration, the information evolution model shown in FIG. 7A contains five information evolutionary levels: level 1 "operate" 110; level 2 "consolidate" 112; level 3 "integrate" 114; level 4 "optimize" 116; and level 5 "innovate" 118. The "integrate" level 3 (116) is a higher information evolutionary level than the "consolidate" level 2 (112) and thus has a greater strategic value of information as well as reflects a greater information capability for the enterprise. This higher value is shown in that the enterprise can use the enterprise-wide view gleaned from the integrated information assets of level 3 to be more agile and proactive in making strategic decisions to address an ever changing market place than would an enterprise at level 2.

Level 1 (as shown at reference number 110) represents the initial level of information evolution wherein an environment focused on the "here and now" challenges of operating today's business. Businesses at the operate level all emphasize activities required to support day-to-day operations, and do not have long-range strategic plans in place.

Level 2 (as shown at reference number 112) represents a level of information evolution wherein companies have consolidated like information into departmental or functional databases for decision-making purposes. Because of the departmental or functional focus, results will be inconsistent across the organization, thus inhibiting an accurate enterprise view of performance measures; however, with significant manual consolidation and reconciliation, an enterprise view that crosses organizational boundaries can be created.

Level 3 (as shown at reference number 114) represents a level of information evolution wherein an enterprise's information focus shifts to an enterprise level. The company sees the importance to define data and information consistently. Information can be accessed by everyone in a decisive role, through a standardized set of applications. Information processes are repeatable. Information requirements can clearly be traced to organizational objectives.

Level 4 (as shown at reference number 116) represents a level of information evolution wherein once an organization has an enterprise view of its performance, the enterprise uses its organization-wide view of its performance to try to maximize performance efficiency. This may include not only alignment of the enterprise's services and products with the needs of its customers, but also optimizing its internal processes to eliminate waste.

Level 5 (as shown at reference number 118) represents a level of information evolution wherein once stock is taken of the company's assets (both tangible and intangible assets) via enterprise information (as in Level 3), and once optimization becomes the norm (as in Level 4), organizations can leverage core competencies in innovative ways to create new markets, new value propositions and new sources of profit.

Through examination of which level an enterprise is at, the information evolutionary model allows a company to assess whether it may consider itself an Intelligent Enterprise. The Intelligent Enterprise consciously and proactively moves its intelligence strategy forward by putting an intelligence layer in place, to proactively and progressively move along the information evolutionary path. A company can be considered an Intelligent Enterprise at any stage of maturity. To be an Intelligent Enterprise, a company evaluates their position on information management, understands their current state, and is proactive in planning and building their future state.

Figure 7B:
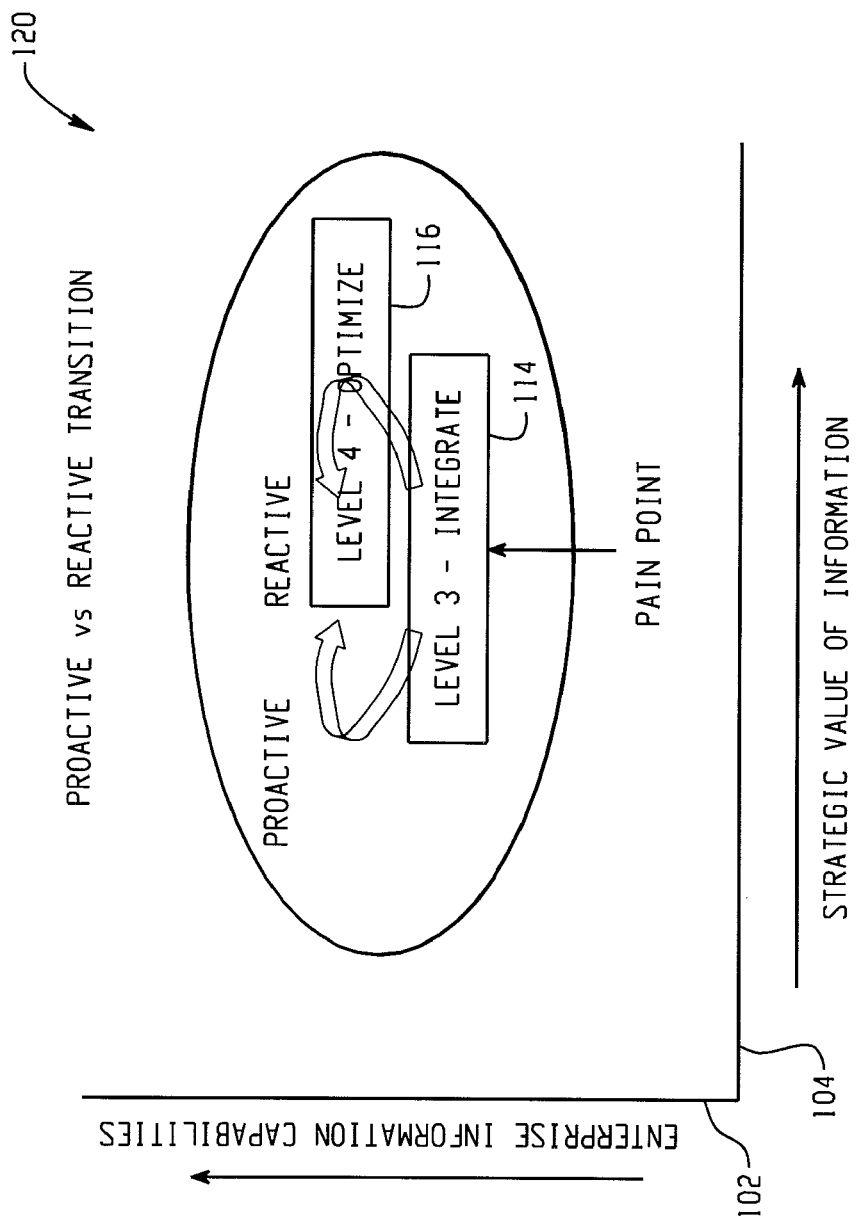
FIG. 7B is a graph depicting proactive versus reactive level transition.

FIG. 7B depicts via graph 120 the problem of a company being reactive instead of proactive. The cost of not acting proactively is high. An Intelligent Enterprise will begin planning for its future environment before the pain of the current environment becomes unbearable. At some point, known as the "Pain Point," the current information environment starts to break down and become dysfunctional. If a company begins its improvement cycle at that point, it has made the de facto decision to operate for an extended time with a dysfunctional information environment. This decision can result in loss of profitability, eroding market share, and diminished product acceptance . . . as all of these results are information-driven. Failure to plan your path through the information management maturity cycle, places your business at risk.

The pain-driven company is also at risk of implementing "quick-fix" information solutions that often become maintenance nightmares, "software orphans," or non-integrated point-solutions that complicate the technical and business environment and detract from corporate goals. (Note that a software orphan is created when a company becomes reliant on a software product that becomes unsupported because the vendor is acquired, goes out of business, or otherwise changes its support commitment). However, the Intelligent Enterprise, following a corporate information management plan, will recognize the need for a long-term information architecture, plan for its implementation in achievable, complementary steps, and move proactively along the information evolution model.

It is noted that enterprises with a proactive information management strategy can maintain a strategic advantage over reactive competitors. There is distinct advantage to being in control of the change process, and to plan out and execute change in advance of your competitors. True strategic advantage is attainable by implementing advanced information management programs ahead of your competitors.

Figure 8:
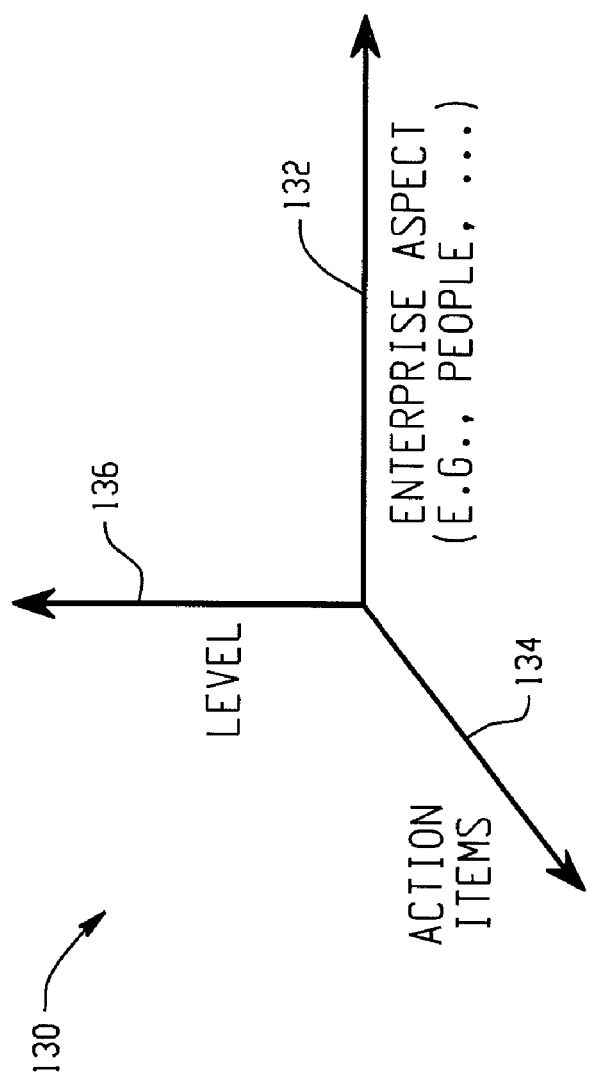
FIGS. 8-10 are graphs depicting interrelationships among enterprise aspects, action items and levels.
Figure 9:
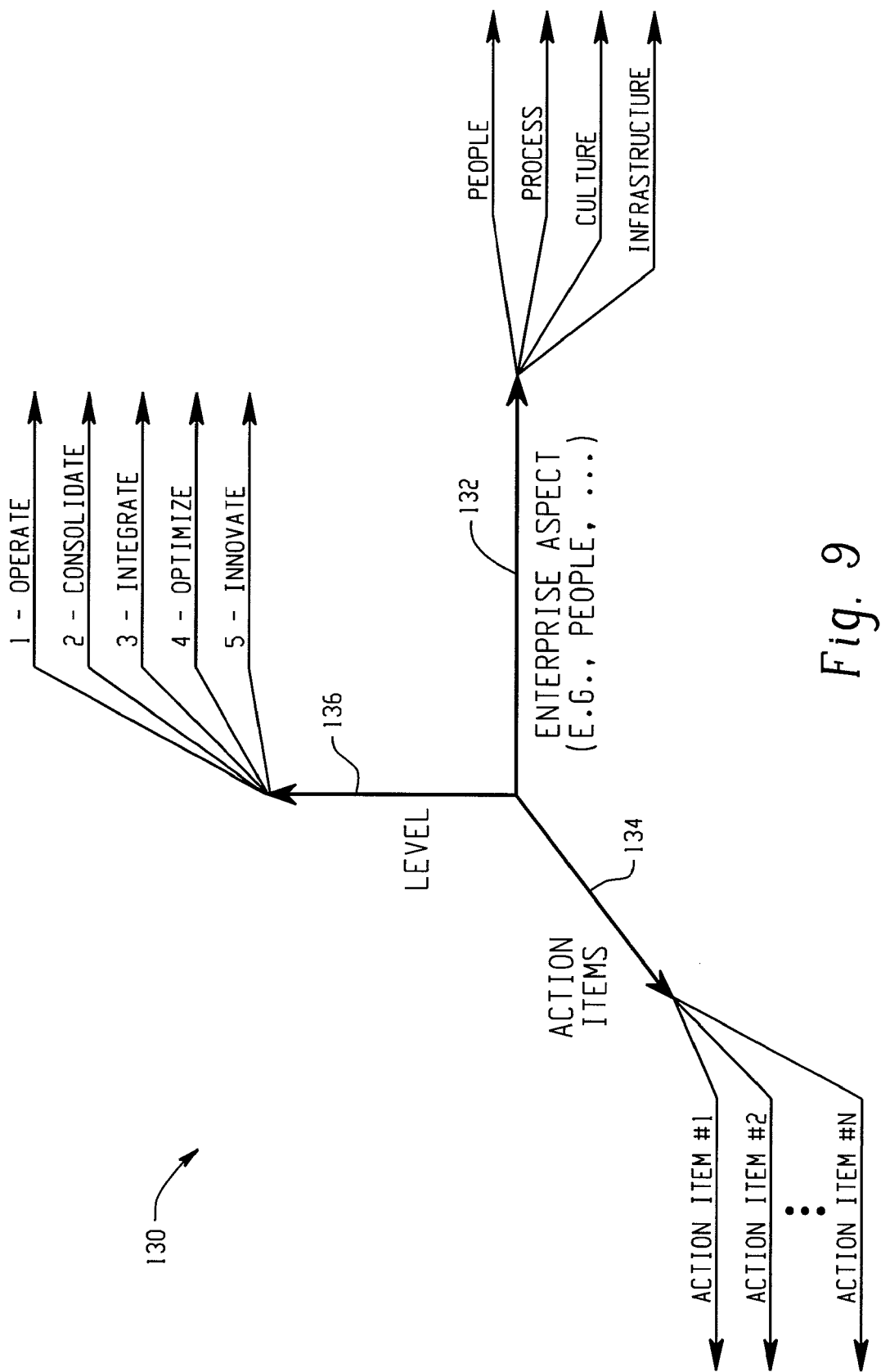
Figure 10:
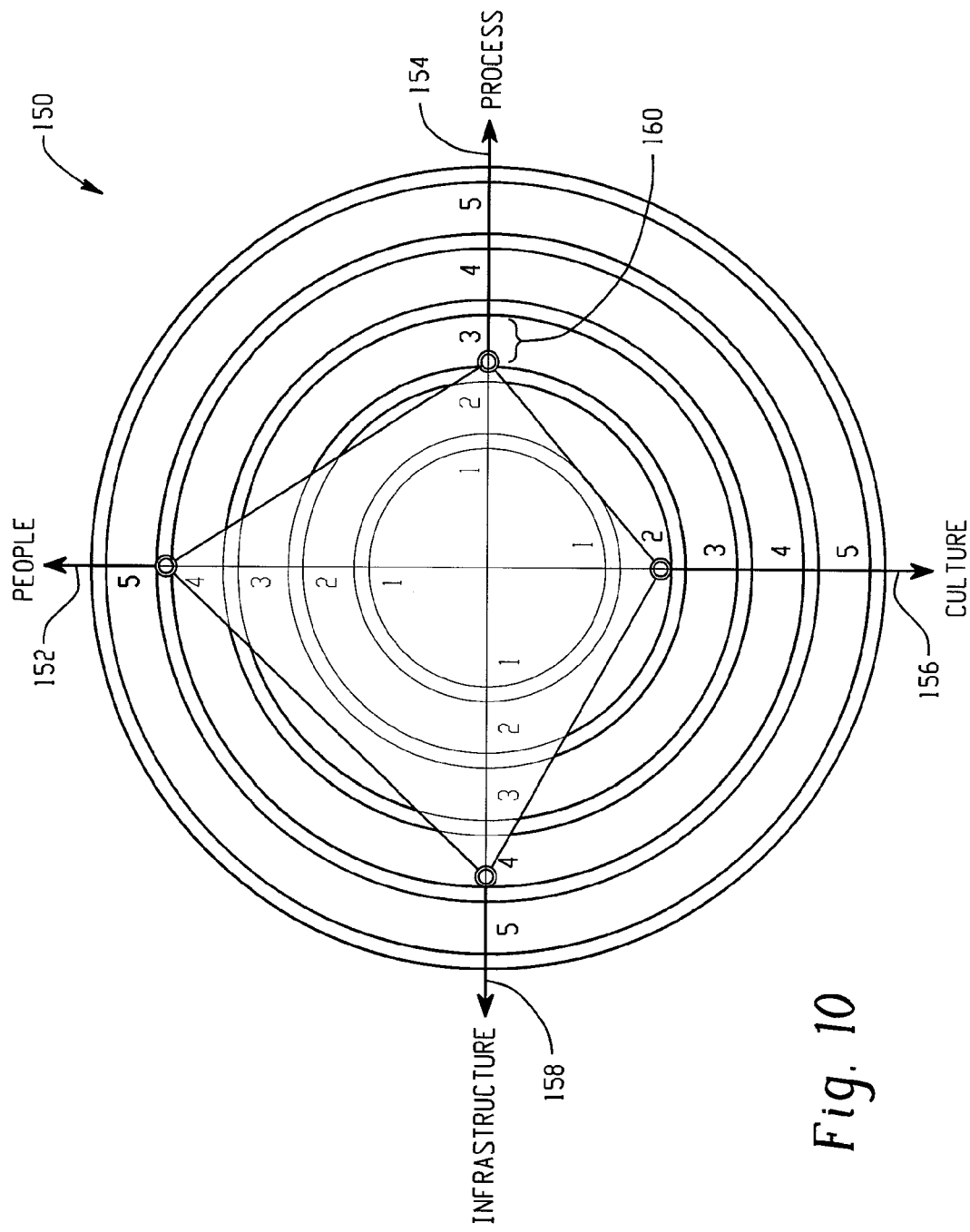

FIGS. 8-10 are graphs depicting interrelationships among enterprise aspects, action items and levels. FIG. 8 illustrates a graph 130 wherein action items 134 are associated with an enterprise aspect 132 to evolve that aspect from a lower level to a higher level (represented on axis 136). FIG. 9 shows greater detail wherein the level axis 136 may assume different values, such as a "Level 1 Operate" value and so on. The enterprise axis 132 may expand to represent four constituency dimensions: people, process, culture, and infrastructure. One or more action items 134 are associated with each of these dimensions (132, 136) to progress the dimensions to their respective next levels.

Figure 11:
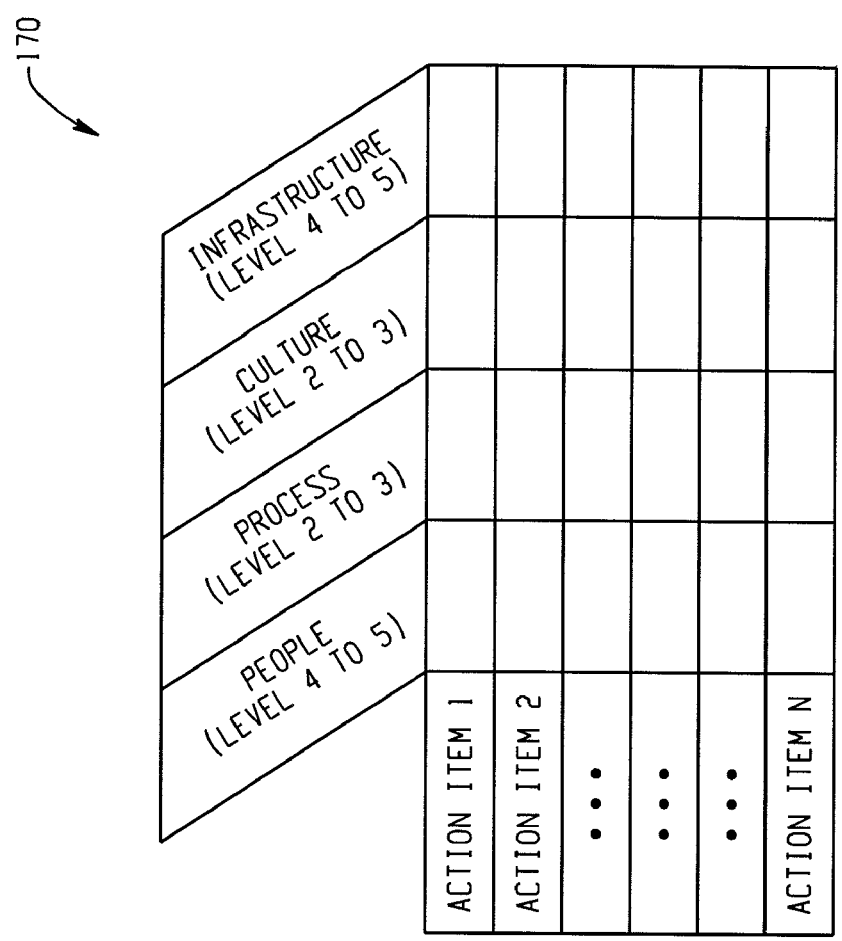
FIG. 11 is a chart illustrating interrelationships among enterprise aspects, action items and levels.

FIG. 10 shows at 150 exemplary level values for an enterprise. For this enterprise, its people constituency along axis 152 was rated at a high level of 4; its process constituency along axis 154 was rated at a lower level of 2; its culture constituency along axis 156 was rated at a level of 2; and its infrastructure constituency along axis 158 was rated at a level of 4. Action items are identified for a constituency so that it can evolve to the next level or if it is at the highest level, then action items are identified to maintain the enterprise's constituency at that level. For example as shown at 160, action items would help the enterprise's processes evolve from a level 2 to a level 3. It should be understood that all of the action items for the different constituencies may be identified at the same time, or the enterprise may prioritize which constituency should be addressed first. FIG. 11 shows a chart at 170 that maps action items to the level progression of a constituency. Through a combination of graphical techniques (e.g., FIG. 10) and/or tabular techniques (e.g., FIG. 11), the multi-dimensional analytic capability of the information evolution model may be expressed.

Figure 12:
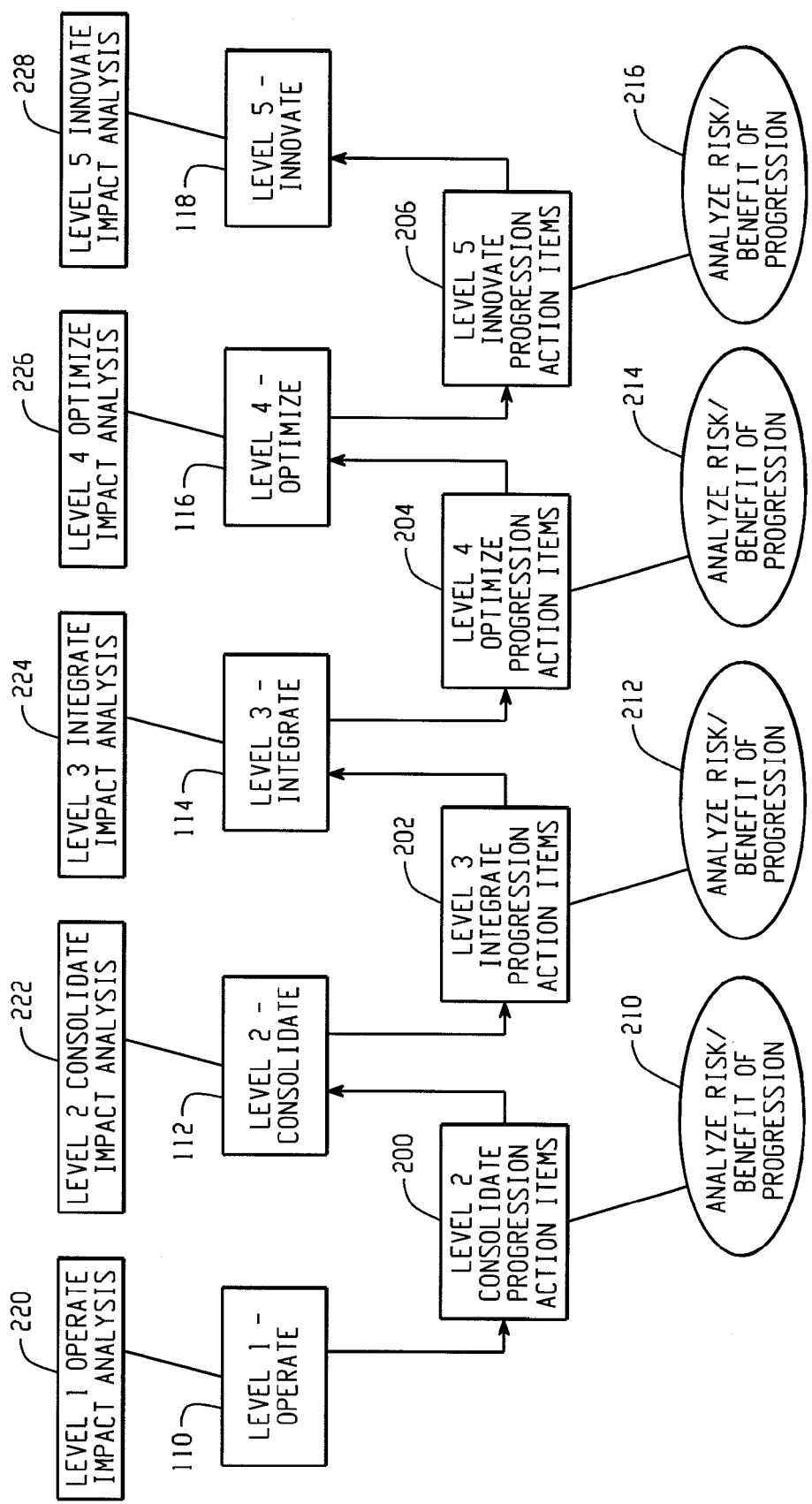
FIG. 12 is a block diagram depicting information evolutionary level progression.

FIG. 12 shows a block diagram depicting where action items (200, 202, 204, 206) fit within the information evolutionary model. The action items (200, 202, 204, 206) identify how an enterprise may transition to the next level. Risk/benefit analysis (210, 212, 214, 216) may be performed to assess the timing of when the action items (200, 202, 204, 206) should be implemented. Impact analysis (220, 222, 224, 226, 228) is also performed to identify what are the therapeutic effects for a constituency in progressing to the next level—which analysis (220, 222, 224, 226, 228) helps in the formulation of action items (200, 202, 204, 206). They will look for solutions that scale, vendors that are stable and in business for the long-term, and products that integrate.

Figure 13:
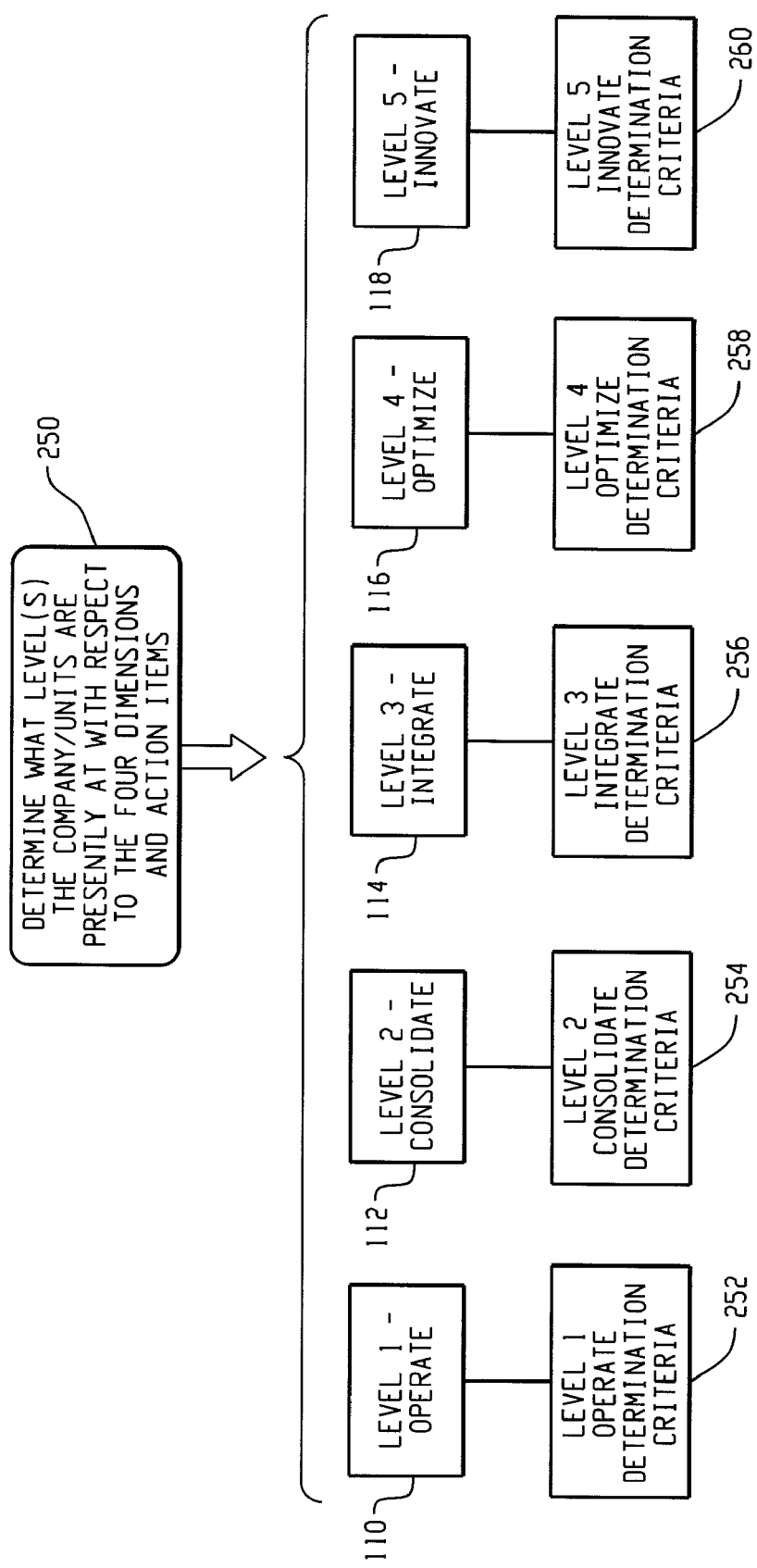
FIG. 13 is a block diagram depicting initial information evolutionary level determination of an enterprise and its constituencies.

As shown by FIG. 13, an enterprise is analyzed at 250 as to what levels the various enterprise constituencies are at. The enterprise may be associated with an overall level as well. Level determination criteria (252, 254, 256, 258, 260) are associated with each level to guide the level ranking of the constituencies.

Figure 14:
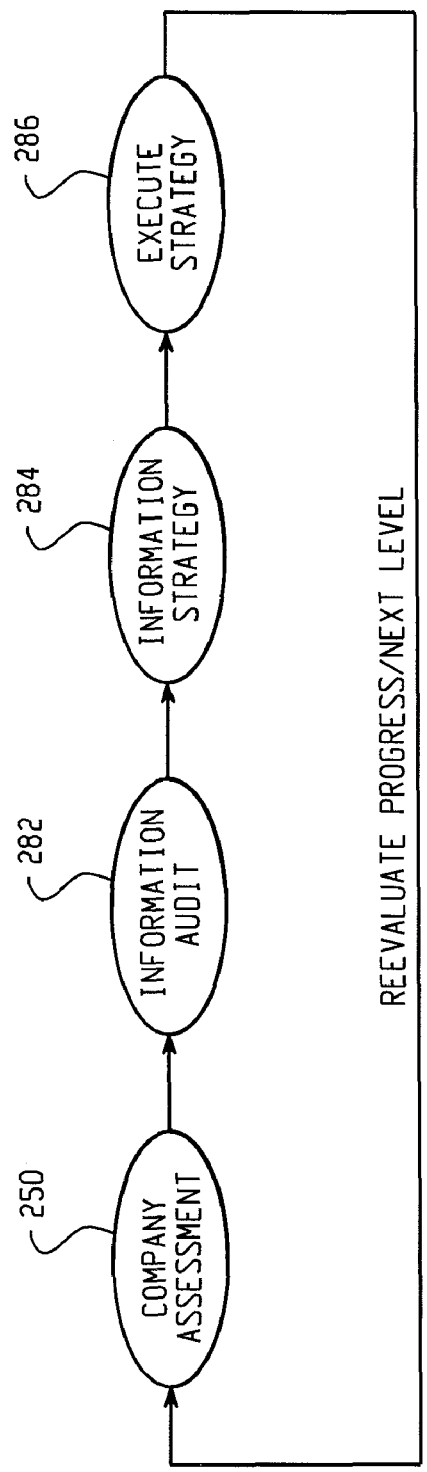
FIG. 14 is a flow diagram depicting evaluation steps for an information evolutionary level.

After the company assessment 280 is performed as shown in FIG. 13, then an information audit 282 is performed as shown in FIG. 14. The information audit 282 analyzes information inputs, information processes, and information outflows of an enterprise constituency. Information input analyses address such issues as: how is information captured, how is it transformed, and how is it defined (e.g., metadata). Information process analyses address such issues as: how is information managed, how is quality ensured, how is it stored for retrievability, and what is the current value of the information asset and is that value being realized (e.g., exploited). Information outflow analyses address such issues as: how is information packaged and displayed for consumers, how is it analyzed, and how is its usage monitored.

The next step 284 is to formulate an information strategy, such as by recommending goals and action items based upon the information audit. Timelines for implementing the action items and achieving goals are communicated to the proper personnel within the enterprise. After management feedback of the information strategy is incorporated, then the information strategy for transitioning to the next level is implemented at step 286. The steps repeat for the next level.

With the information evolution analysis process discussed, a more detailed description of the levels follows.

Level 1—Operate

Figure 15:
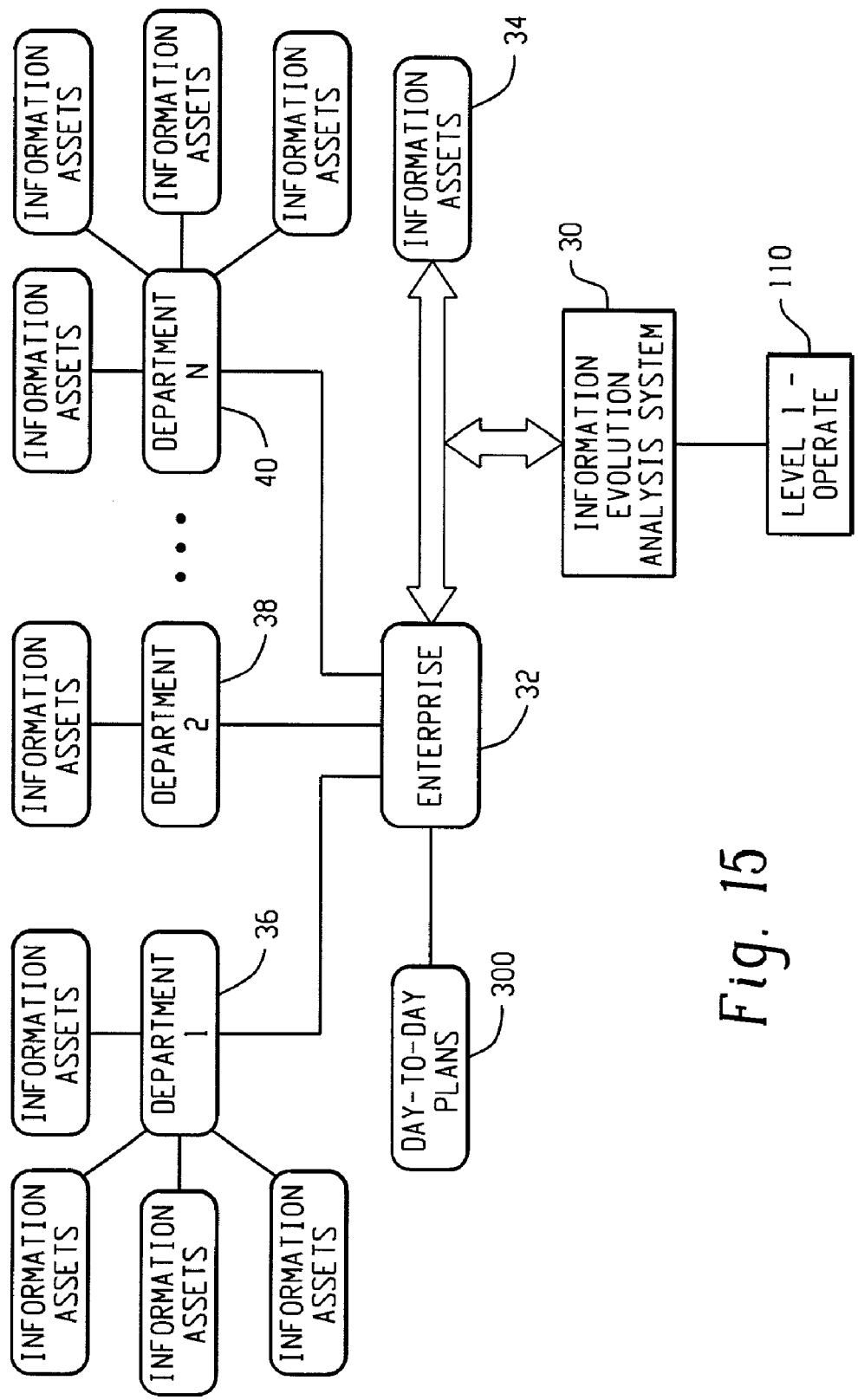
FIG. 15 is a block diagram depicting a level 1 operate scenario of an enterprise.

FIG. 15 illustrates a level 1 operate analysis depiction of an organization 32. Level 1 (110) represents the initial level of information evolution, an environment focused on the "here and now" challenges 300 of operating today's business. This environment could be seen in a number of different contexts, such as a start-up organization (see case study below on the XYZ.com organization), a struggling-but-mature enterprise (see case study below on the Smith Brothers Printing organization), or entrepreneurial organizations with strong leaders. These businesses all emphasize activities required to support day-to-day operations, and do not have long-range plans in place. The environment allows "stove-pipe" applications' and transactional systems to exist to support fragmented business operations. (Note that stovepipe applications refer to applications that are oriented vertically around a function, but do not integrate across functional lines). Organizations at Level 1 are often successful due to visionary leaders, internal mavericks, and luck. These enterprises generally operate and make decisions in an unplanned and chaotic information environment.

Individuals needing information in Level 1 organizations often have to develop their own, or use existing production-oriented reports to perform their own analyses. "Information stars" and "Data czars" (e.g., those who keep a tight grip on information assets) develop, and control the data access, analysis and interpretation processes. They thrive on the power gained from being the go-to resource. Individuals in this environment often leverage information to their own personal benefit. An individual's control over information may, however, compromise enterprise goals, and limit opportunities for overall enterprise improvement. The Level 1 organization as a whole misses the opportunity to benefit from its information assets, because individuals flourish at the expense of the organization. Because success at this level depends on individual heroics, there is little capability for repeating successful processes once key players leave the organization. This is a classic case of information assets being under-utilized.

This environment is internally competitive, lacking consistent evaluation and performance criteria. This is an "everyone for himself" information culture, where individual objectives prevail and people obtain information any way they can—personal networking is a most preferable! In the technical environment, all kinds of analytical tools and technology platforms may be present, but they tend to be client, rather than server-based in nature. Information costs can actually be quite high due to redundant processes, duplication of data interfaces and extracts, and inconsistent data collection processes.

Level 1 Key Characteristics

Obviously, few organizations will perceive themselves at Level 1 (110). However, if any of the following characteristics resonate, then there are components of Level 1 at work in your organization.

Individual leaders or mavericks have the authority over what and how information is used.

The information infrastructure, including both technology and governance processes, is non-existent, limited, highly variable or subjective.

Individuals have their own methods of finding out what information is available and analyze it according to personal viewpoint, which is then adopted as "corporate truth".

More specific characteristics of this level relative to the constituencies may include:

People:

Information autonomy

Anarchical, some expectations to use information. However, everyone is responsible for their own information needs.

Organizations generally have information mavericks with tights grips on the information, this is their power. They only give it out when they have to. These individuals tend to be very technical in nature and leverage this capability to their advantage. They are generally seen as saviors, even though folks should be questioning the quality of the data.

Information use is totally dependent on the strengths of the individuals skills. Skills have to be fairly sophisticated and technical in nature.

Process:

Organization do not benefit at all from data in the organization as there is no way to tie it to the great good.

Employees rely on "Grapevine" and personal networks for information.

If any information processes exist, they are individualized and informal. There are no goals other than to get your job done. No processes to improve information process. Very reactive.

High duplication, inconsistent, poorly documented processes.

No change control.

Data Quality is not even considered. Data is assumed valid as is where it is. You are not doing much transformation or manipulation.

Limited opportunity for improvement. Improvements are made on "gut feel" and success is also judged that way.

Collaboration is 100% informal.

Information is distributed through very conventional means.

A large amount of time is spent gathering information versus using it.

Culture:

Focused on day to day reporting

Everyone for themselves

Very competitive internally from an information ownership point of view

Information is power

Infrastructure:

There can be analytic tools of all shapes and sizes, but they are personal in nature.

No (or little) governance in place for information.

Level 2—Consolidate

Figure 16:
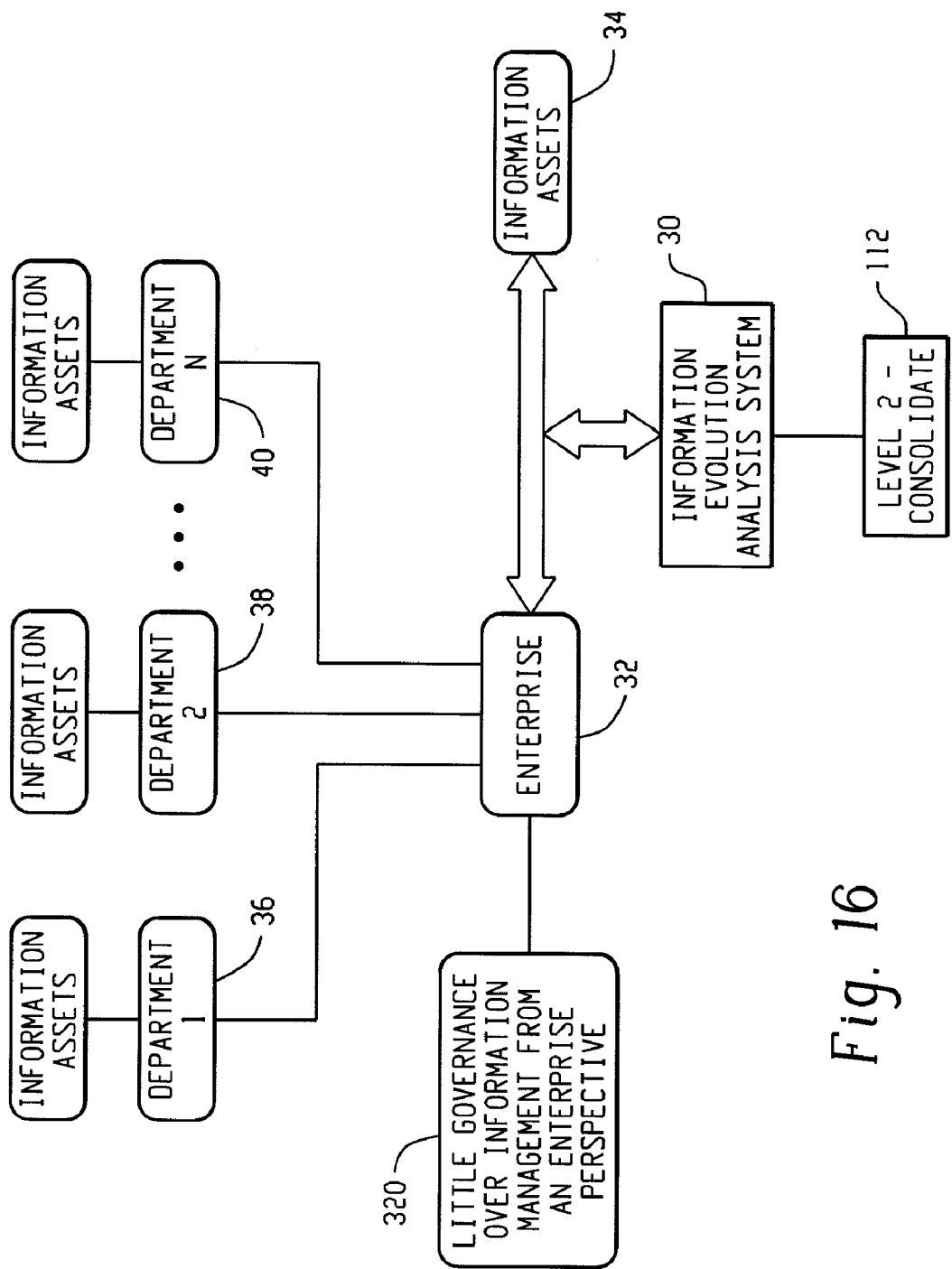
FIG. 16 is a block diagram depicting a level 2 consolidate scenario of an enterprise.

FIG. 16 illustrates a level 2 consolidate analysis depiction of an organization. At level 2 (112), companies have consolidated like information into departmental or functional databases for decision-making purposes. This might be viewed as the land of the departmental data mart. While there may be some overarching enterprise information, it is typically generated by manual consolidation of departmental information.

Moving to Level 2 implies the consolidation of information efforts, and can once again be done as part of an overarching information management plan (the Intelligent Enterprise approach), or as a one-off process. Requirements for information solutions can be traced to departmental needs, and point solutions reflect a functional focus. In a level 2 organization, data stores and decisional applications are designed, developed and supported within departments. However as indicated at 300, there is little governance over the information management process from an enterprise perspective.

Within departments, managers and data experts have vested interests in maintaining departmental data. Subject Matter Experts (SME's) evolve as the owners of 'good' data for their department, and are rewarded for their ability to help the manager move along departmental agendas. End-user computing organizations emerge to provide reports and analyses for the less data-knowledgeable. Department heads make more informed decisions, but may screen enterprise business management from selected results if the results reflect poorly on their department. Incentives are based on meeting departmental goals, even at enterprise expense.

In the Level 2 organization, departmental metrics are important indicators of performance. Analytical solutions such as campaign management, supplier evaluation, or budgeting can begin to be implemented. Because of the departmental or functional focus, results will be inconsistent across the organization, thus inhibiting an accurate enterprise view of performance measures; however, with significant manual consolidation and reconciliation, an enterprise view that crosses organizational boundaries can be created. Still, predictions may err due to a limited data scope, and by being focused on a functional perspective. New opportunities can challenge disparate functional units to have to work together, usually with limited results.

In this environment, departmental interests dictate that staff and funding are dedicated to achieving departmental objectives, with the hope that the entire enterprise will be better off. Organizational politics may increase, as department heads try to make their departments shine. Occasionally, some internal teamwork and informal collaborative sharing of information increase departmental learning, as data context is understood and communicated traditionally within departments (meetings, memos, and simple document sharing) but understanding of data is still mostly "tribal" knowledge, and highly protected by the SME's, who see this as their value proposition.

In a Level 2 organization, the cost of information is still high. Departments may decline to fund efforts that benefit other groups or distract them from their own missions. Although there may be uniform hardware, networks and software in place, they are not used consistently. The departmental perspective works against establishing common enterprise wide technology standards and frameworks beyond the basic infrastructure.

Data definitions and data collection processes within Level 2 organizations are more streamlined than in Level 1, but usually only within the functional silo. While some localized governance of information may exist, it is inconsistent across the organization, and may negatively impact productivity. Duplication of effort is still a problem as are redundant tools and interfaces. However, some of these tools may be quite sophisticated (modeling and mining), even within departments.

Level 2 Key Characteristics

More organizations will see themselves in Level 2 than Level 1. Some characteristics to provide guidance as to status are:

A departmental orientation drives decisional solutions.

Independent department islands of information.

Departmental data consolidation and access.

Departmental business measures that are inconsistent across the enterprise,

Multiple interfaces and extracts against the same production data.

More specific characteristics of this level relative to the constituencies may include:

People:

Team work within department.

Information is used to support functional purposes and goals.

Information Mavericks become subject matter experts and owners of good data for their functional department.

People are reward on high levels of performance of the department, even if that is at the cost of other departments.

Overall organization is beginning to get an enterprise view from information from each department.

Process:

Centralized metrics are consolidated manually and at great effort.

There are formal department or business unit information gathering processes to support departmental reporting.

Any proactive information analysis is generally performed by mavericks or subject matter experts.

You will begin to see packaged analytic applications at this point in support of functional processes.

Stream line processes, metrics to measure them, data quality will begin to play a role Culture:

Competition across departments

Damage control

Mistrust of results from other departments, organizations have a lot of recognition and decision making becomes very political Departmental goals will drive a level of informal collaboration within departments.

It will be inefficient through meetings, e-mail and simple document sharing.

Infrastructure:

There might be uniform hardware, networks and software in place, but it is certainly not used uniformly—at least intentionally.

Departmental analytical apps.

Standards exist only within functional boundaries—corporate-wide there are competing standards.

Analytic tools are used still by mavericks and SME.

End-user computing organizations begin appearing.

Governance is localized. Standards cover only basic infrastructure.

Transition to Level 2

The typical path from Level 1 is to begin consolidating data around functional requirements. This may also align with the departmental organization of the company. Level 2 in the Information Evolution Model is "Consolidate," representing the effort to consolidate like information into departmental or functional systems.

If pain is the catalyst for moving away from Level 1, it will come in the form of excessive operating costs, data inconsistency and redundancy. Managers may even have missed opportunities to react effectively to market changes, or may have significantly missed corporate targets because of bad or missing information. Leaders recognize the risk and costs of losing knowledge when employees leave. Action Items in transitioning to Level 2 may include:

Develop enterprise and departmental business information requirements, metrics and incentives.

Base decisions on fact-based analysis, look for managers who are analytical, and formalize the Subject Matter Expert (SME) information analysis role.

Sponsor and manage information projects that support departmental objectives, and that can later contribute to an enterprise information environment.

Develop the information infrastructure (platform, tools, procedures) to support these departmental efforts, with an eye to the future.

With respect to action items, when the management of the company commits to making fact-based decisions, they are replacing "gut-feel" with analysis. This requires an information architecture that identifies, collects, and exposes production data such as product, supplier, and customer activities to the management team. This team is prepared to analyze trends and correlations within this information, either directly, or through Subject Matter Experts.

This information then drives performance at least at a functional level. This means that departmental managers develop enterprise and departmental business information requirements, metrics and incentives, and manage their area of accountability with information.

The management team sponsors and manages information projects that support departmental objectives, and that can later contribute to an enterprise information environment. This means they plan a global information architecture, but can act locally, building a piece at a time.

Pain-motivated enterprises will react to these stimuli by implementing point solutions. The Intelligent Enterprise, conversely, will recognize the risk of these issues, and begin the planning process. Level 1 is a stepping-stone to a future environment, and the Intelligent Enterprise will consider the long-term impact of this level on the people, process, culture, and infrastructure of the organization. They will look for solutions that scale, vendors that are stable and in business for the long-term, and products that integrate.

Benefits of Moving Ahead Proactively

Because an Intelligent Enterprise does nothing with information that does not affect the business, enterprises moving proactively to Level 2 should look for these justifications for the required investments:

1) Process redundancy and cycle times will be reduced. Once implemented, specific functions can be analyzed for effectiveness.

2) Departments will spend more time analyzing information, versus spending time gathering data. This will yield more profound insights into the business.

3) Information processing costs will decrease as efficiency in data movement and transformation improves.

4) Within business functions, some degree of consistency and continuity will improve employee motivation, and inspire confidence in the results of analyses.

5) Improved level of teamwork.

6) Improved operational performance.

Case Studies

The two cases that follow are examples of companies that might be at a Level 1 in the information evolution model. XYZ.com takes a proactive approach to information management, while Smith Brother's Printing is driven to action by pain.

Case A: XYZ.com

Jerry Johnson is a founding partner in XYZ.com, a California Internet start-up that is focused on supplying English language and translation-to-English dictionaries to educational facilities throughout the world. Jerry and his partner, Tom Termer, have invested heavily from their own personal funds to build a business plan, incorporate, and develop prototype websites for shopping, order entry and customer service, as well as building a reference book portal. They have begun to get orders, and are drop-shipping product directly from their suppliers so they don't have to carry an inventory.

XYZ.com has just received its first round of venture capital, and Tom looks forward to being able to hire a couple of staff members to offload the day-to-day production support. Jerry would like to use some of the VC money to begin building an information architecture, as the work it took to pull together the numbers required to present their case to the venture capital company, and to answer their questions nearly killed him. In fact, some of the figures changed each time they tried to calculate them, and both guys were sweating bullets during the due diligence process.

With orders rolling in, Jerry sees the need to better understand and monitor XYZ.com's processes, learn as much as possible about its customers, and begin evaluating its suppliers. Right now, it's strictly seat-of-pants, and Jerry is afraid that something critical will slip by them and put them out of business. He has drafted a one-page information plan, and proposes to begin investing in an information architecture that will meet today's immediate needs, yet grow with XYZ-.com as they grow. He is beginning to talk to vendors about tools and solutions.

Case B: Smith Brother's Printing

Fred Smith is sole proprietor of Smith Brother's Printing, a specialty-printing house in Chicago. Smith Brother's is a family business, and Fred is the sole surviving brother. They are in a unique market niche, printing gold leaf-inlaid labels for high-end cosmetic, perfume, and jewelry boxes. The business has been very good throughout the 40 years Fred has run it, and Fred lives comfortably with his wife. None of his children ever showed an interest in the business.

Fred has always been a hands-on manager of the shop. His primary focus has been producing the quality products his customers need. He has been involved in every major sales deal, every supplier and union negotiation, and every investment and capital purchase decision. While he pays his top-tier managers and shop foreman production bonuses, he seldom delegates any decision of importance.

Problem is that Fred is ready to retire. He has lost the fire he once had about the business, and his health has been declining. During a couple of recent illnesses, his managers had to visit him in the hospital a couple of times just to keep production running. He's ready to move to his lake house and fish.

Smith Brother's business information is all in Fred's head. To compound things, patents that Smith Brother's held on their gold-leaf printing processes expired last year, and a Taiwanese printer is coming online using the Smith's process at a modern, automated offshore plant with a cheap labor pool. His managers have formed a collaborative effort to buy out the company, and plan to keep Fred as a consultant until the knowledge transfer takes place. They have brought in a consulting firm to help build some information infrastructure to automate some of Fred's expertise in a customer data warehouse. Maybe next year they can afford to tackle supplier information.

Analysis of Cases A and B:

Both of these companies recognize they need to mature in their information capabilities—but the point at which they commit to action is the key differentiator. XYZ.com, even while in the midst of start-up activities, is looking to the future, and proactively establishing a framework for information management. Smith Brother's Printing, on the other hand, is being forced to evolve, at the risk of closing down.

Implementation of solutions will have vastly different results in these two companies. For example, at XYZ.com, the implementation of a scalable information architecture will boost productivity, clarify results, and enhance the ability to align activities with key goals. As a company, XYZ.com is ready for a new information paradigm. They recognize the need and are moving quickly to stay in a productive state. They are not being driven to change by any specific business pain. They are driven, more appropriately by the knowledge that if they do not change, pain is inevitable, and will become an overwhelming "drag" on productivity.

Smith Brother's is facing that very thing. They are in serious dysfunction because they have a mature business model and an immature (or non-existent!) information strategy. Any useful information system they implement will create a large scale for corporate culture to change in order use the information effectively. The staff needs to get up to speed on what information it takes to run the business. It is definitely harder to change people's behavior than it is to change software systems!

Level 3—Integrate

Figure 17:
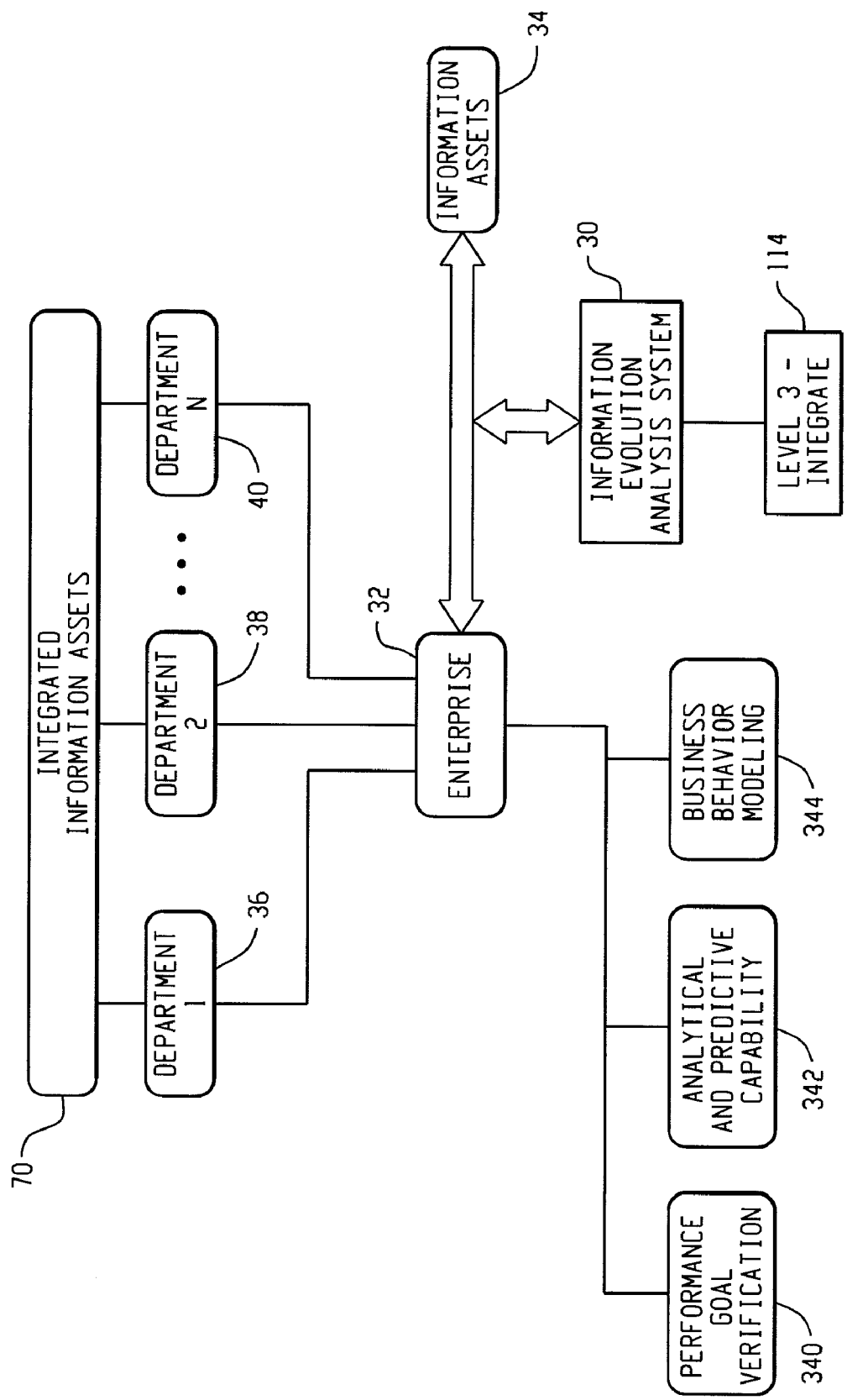
FIG. 17 is a block diagram depicting a level 3 integrate scenario of an enterprise.

FIG. 17 illustrates a level 3 integrate analysis depiction of an organization. At Level 3 (114), organizations establish an integrated information environment across the enterprise. The company sees the importance to define data and information consistently. Information can be accessed by everyone in a decisive role, through a standardized set of applications. Information processes are repeatable. This level also may provide that information requirements be clearly traced to organizational objectives—information supports and enhances the company's ability to create value for its customers. Throughout an enterprise, information is widely accepted as an essential tool to operate the business. This level is truly a break-through-it positions an organization to make business decisions that streamline enterprise performance and value creation.

Corporate alignment becomes a dominant theme. In the integrated information environment, information is accessible to an increasing number of users as knowledge workers, managers, and executives exploit information to influence the business. The ability to take actions based on complete and accurate information increasingly empowers employees. Training and organizational development encourage consistent access and use of data.

Level 3 organizations use information to verify performance goals (as indicated at 340). Processes are optimized by monitoring performance against a base of consistent information. As indicated at 342, Quantitative structured data is used for analytical and predictive purposes. This allows the organization to look forward with information, as well as react. As indicated at 344, level 3 organizations will also use information to model business behaviors and will start to take the initial steps to expand its use of contextual knowledge in the form of business documents. Cross-subject area data, aggregate views, data mining and history enable the business to make decisions and react from an organization-wide perspective. Level 3 organizations deal with internal data, but external data may also be included.

Integrated data enables risk management to be formalized as the influence of a wide number of factors on event outcomes can be considered. Culturally, level 3 companies also start primitive collaboration as cross-functional sharing becomes routine.

Level 3 uses an integration strategy that strives for comprehensive data in a robust, well-managed environment. An enterprise data model, common measures, definitions, data standards and metadata are all used to increase understanding and sustainability. Consistent data collection and quality processes are adopted. Data movement is managed via approved tools or robust middleware. Security and privacy concerns are recognized and managed and data is protected, both logically and physically.

Level 3 Key Characteristics

An enterprise knows it is at Level 3 when its information focus shifts to an enterprise level. Organizations can recognize that they are at Level 3 if they have these characteristics:

The organization relies on cross-enterprise information for making decisions.

The organization is able to identify alternatives and act on information from a perspective that reflects enterprise goals and objectives.

An enterprise information governance process is in place.

Enterprise data frameworks are designed and implemented.

Information management concepts are applied and accepted.

There is institutional awareness of data quality.

More specific characteristics of this level relative to the constituencies may include:

People:
  Going to have incentives to use the appropriate information.
  People in this environment are beginning to think outside of their functional areas of responsibilities.
  Multi-disciplinary workteams are established to resolve data definitional and quality issues.
  People tend to be quality conscious and focused at enterprise success. Someone owns data quality.
  Cross functional decision making is enabled
  People can visually see the information drivers that help them accomplish their goals and how it impacts corporate goals.
  People have to understand how to act upon information, this completes the shift from technical
  Decisions are being made on analyzed results from enterprise information.
Process:
  Enables cross functional collaboration
  Information is uniformly available across functions
  Formal processes moving and positioning information for integrated access
  Multi-disciplinary workteams are established to resolve data definitional and quality issues.
  IM Process, plan in place.
  A central, federated control over data stewardship and data ownership.
  Data Quality processes defined and implemented across enterprise.
Culture:
  People are enabled to work together for the greater good of the enterprise, but still not mandatory.
  Start to look at things from a holistic perspective
  Start to allow the externalization of information
  Alignment with enterprise goals become mandatory and enterprise wide measures are established
  Business leadership is 100% behind changes and moving forward
  Organization rely more information processes then on the subject matter experts
Infrastructure:
  Has to be adjusted to deal with volume and complexity increases
  Information transformation and emphasis on data quality are mandatory and key
  Governance becomes key—enforce compliance and resolve cross organizational issues
  Stream-line tool set
  There are measures in place to measure the effectiveness of your organizational intelligence
  Metadata becomes a centralized concern for IT
  Need an understanding of your organizations information value chain—cause & effect Transition to Level 3

Intelligent Enterprises at Level 2 will view this as a stepping-stone to enterprise information integration on an architecturally sound information platform. The period of time in the departmental mode may be brief Companies that procrastinate in the work needed to consolidate departmental data into an enterprise view (the thrist of the move from Level 2 to Level 3) will ultimately begin to suffer from high costs, will miss opportunities to compete because their data is trapped in siloed system, and will be unable to respond to opportunities and threats effectively. Despite having implemented departmental business intelligence solutions, these companies have difficulty meeting organizational objectives and revenue goals because of these pains. Often, a company will even lose customers when stove-piped data prevents consistent customer interaction.

If sufficient work is not done to prepare the culture for this change, business areas will fight to maintain their traditional functional focus. The traditional "what is a customer?" battle will be supplemented by difficulty in reaching consensus measures, and altered business processes. Traditional data keepers may react to a perceived threats decision results cut across internal organizational boundaries. To overcome resistance, performance standards tied to organizational goals are used. Gradually, a commitment to perform at an organization-wide level will predominate The steps to be taken to move from Level 2 to Level 3 level are significant and require a demonstrated business case, strong organizational sponsorship, and technical solutions that support an enterprise level of integration. The action items may include:
  Define enterprise-wide business measures and then run the business by them.
  Formalize efforts to align existing business intelligence efforts to enterprise goals, and to ensure alignment of future efforts.
  Define an enterprise-wide strategy and framework for integrated information management.
  Create incentives for employees to achieve cross-functional results.
  Establish the governance infrastructure to sustain an integrated information environment.

The benefits of transitioning to level 3 may help provide arguments for funding the transition such benefits may include:
  1) Higher returns on customer and supplier relationships via retention and efficient supply chains.
  2) Improved time to market.
  3) Faster response times to market changes.
  4) More customers and retention of existing customers.
  5) Lower and sustainable costs for information handling.

Case A: SmallState Insurance

Jim Wernick, CIO of SmallState Insurance, is ready to push forward with the next phase of his comprehensive information management plan. SmallState has spent the last two years building departmental data marts around customer data, financials, products, and suppliers. The department analysts, who were subject matter experts on their data, and were also well versed in the department's needs, designed these data marts.

The systems staff helped drive some consistency across all departments—Jim knew from his readings and what he had heard at trade shows that it was going to be critical not to have to rework anything when SmallState decided to fund rolling these applications up to the enterprise level.

He had insisted on some basic standards such as creating libraries of common data elements, algorithms, and data transformations, and on selecting tools that integrated and could scale to their future needs. It was expensive enough to fund doing this work once . . . the last thing he wanted to do was to go to the CEO and tell him they needed to re-do applications in order to move forward on an enterprise view!

In fact, pulling an enterprise view together now should be pretty simple . . . departments heads are involved in the process and already aligning their group's metrics with corporate goals. Implementing an enterprise data warehouse will require the creation of core reports to track against those metrics, and managing those metrics as part of everyone's job. Jim's plan is to implement the core reports through a reporting portal, then give end users access to an ad-hoc reporting tool, and an online analytical tool to cover the needs of more analytical users. Finally, a data mining tool is to be implemented. Employees are already voicing support for his efforts, and Jim can see that they are excited about expanding the use of information to improve their business!

Case B: OurBank

Barbara Oglesby, the new CIO at OurBank, a large regional bank in the northeast, has inherited a challenge. OurBank had recently acquired two other banks; one of them had just gone through a merger last year. As a result, OurBank now has 13 different business intelligence applications, using 10 different software products.

Barbara is preparing to meet with Mr. Snipes, the CEO, to present her ideas on corporate information architecture. It is clear to her that OurBank needed to fix these problems before they can compete effectively.

What really worries Barbara is the state of affairs OurBank's systems were in before the merger. OurBank alone had five separate departmental data marts running, and no consistency of applications, tools, or data models. In fact, the president had received two separate marketing campaign mailings over one weekend, one offering a mortgage equity credit line for bill consolidation—targeted to people with high debt loads—and a second offering a new pre-approved credit card—offered to customers with good credit ratings!

The boss didn't want to hear that the Mortgage department was working with different data than the Credit Card department, or that the systems didn't know what each other was doing!

OurBank was going to have to invest to straighten this mess out . . . it was going to be expensive and time consuming, but before they could get to an enterprise view of their business, a lot of what they already had was going to have to change. And Barbara had already learned how difficult change could be at OurBank. Getting the departments to go to a standard set of software products, and to agree on common data definitions was going to be a real challenge!

So she needs Mr. Snipes to support this effort. Without his support, Barbara will be unable to change their plight.

Analysis of Cases A and B:

Both OurBank and SmallState are in the same level of information evolution. Both have departmental data and systems to accumulate and report departmental decisional information. The key difference is that one (SmallState) had built their departmental systems with an eye to the future. They had established an overarching information management strategy, and a plan to get there. They had realized that when the finished building departmental datamarts, it was simply a stepping stone to the enterprise environment. They had planned for not allowing rework. They had built for the future.

OurBank, only partly through its own fault, is caught in a situation where they need to do significant clean-up work just to get ready for an enterprise intelligence platform. While this is not the most desirable position to be in, the choices they make at this point will be critical to their future success. If they are to succeed in getting a scalable, integrated platform developed for the enterprise level, they first address the dysfunctional departmental data situation. This may be time consuming, but moving forward on an enterprise level project without cleaning up the departmental data issues will create larger problems than they already have, and most likely result in a failed enterprise intelligence project.

Level 4—Optimize

Figure 18:
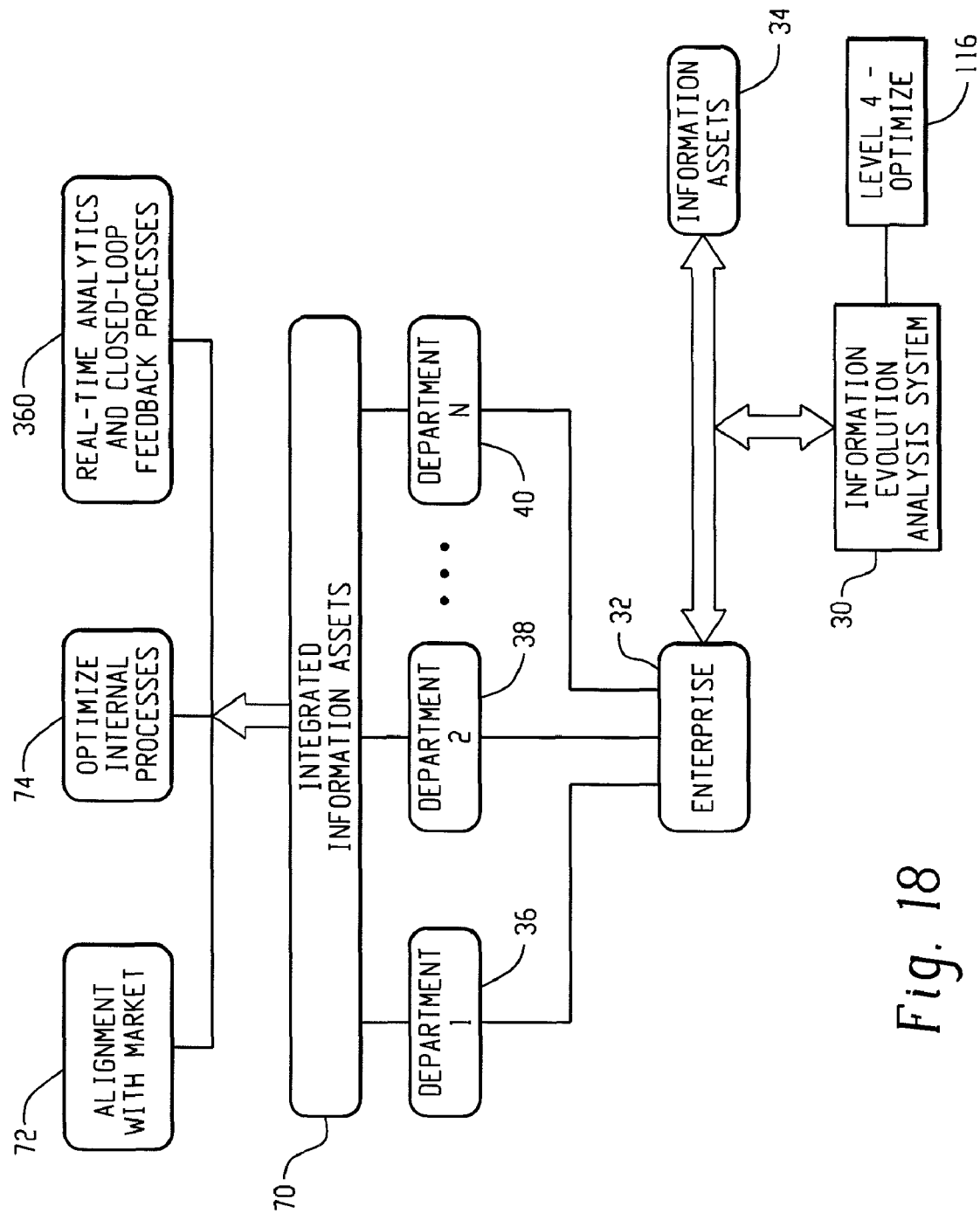
FIG. 18 is a block diagram depicting a level 4 optimize scenario of an enterprise.

FIG. 18 illustrates a level 4 optimize analysis depiction of an organization. At Level 4 (116), the organization focuses the integrated information environment on achieving major business process productivity gains. Once an organization has an enterprise view of its performance, it uses that to align the enterprise to the needs of the market and to try to maximize performance efficiency. The enterprise information environment helps drive the organization's productivity goals. During this process, the enterprise establishes a clear picture of its value creation and uses the integrated information assets 70 to achieve better alignment 72 with the market and to perform optimizations 74 with respect to some or all aspects of its processes, thereby eliminating waste and inefficiency. This may include not only optimizing its internal processes to eliminate waste but also ensuring that its products and services are aligned with the needs of its customers. The scope of Level 4 can be the entire business value chain, including product and customer profitability, supplier performance, marketing effectiveness, employee productivity, supply chain optimization, customer satisfaction and other measures. Efforts to reduce costs and increase profits through process optimization and efficiency become paramount. As the organization eliminates the more obvious inefficiencies, it will need to rely more heavily on embedded analytics to root out less obvious flaws in its performance.

Knowledge workers, the mainstay of an organization at this level of evolution, are very focused on incremental process improvement. Everyone leverages information and uses analysis, trending, pattern analysis and predictive results to increase effectiveness. As efficiency improvements become harder to find, the enterprise will extend to look at its entire value chain, including customers, suppliers and partners, creating inter-company communities with a shared interest in efficiency of operations.

Low latency (or real-time) analytics and closed-loop feedback processes 360 are implemented in this stage, as the results of analyses are fed back into operational processes. This organization will model workflow interactions across its information value chain to develop new optimized business models. In order to continue finding improvements, new quantitative measures monitoring cause and effect relationships are defined, selected and tracked. The information value chain is examined for customer touch points and their effect on business processes. This integrated customer information is analyzed to detect patterns, predict future behavior, and understand customer needs for consistent and immediate customer responses.

In order for this to all work together, the corporate culture embraces an incremental improvement mindset. At this level, empowered individuals will make change, supported by real quantitative information. Internal competition that once stymied cross-department efforts has been replaced by collaboration and interdependency. As the information value chain evolves, companies can create new business models that are efficient and information 'enabled.' Widespread access to internal and external information provides broad context for understanding and allow communities of interest to share experiences and further tune the business model.

Information is so integral to business processes at Level 4 that if a breakdown in the information flow occurs, continued operations are jeopardized. Therefore the infrastructure is reliable and fault tolerant. Data quality processes is prevalent. Legal requirements, and the need to build trusting customer relationships drive data security and privacy policies as large amounts of information regarding customer behavior become available for analysis. A Level 4 organization uses automated rules and pattern detection systems to detect and respond to anomalies, defects, and variations.

Level 4 Key Characteristics

Based on optimizing the information value chain, constant feedback on critical process measures, and leveraging best practices, Level 4 organization achieve improved efficiency and effectiveness. Organizations can recognize that they are at Level 4 if they have these characteristics:

Incremental improvement mindset.
Closed-loop feedback from decisional analysis to transactional activities.
An information context based on workflow.
Sharing of experience through collaboration.
Communities of interest prevail over functional departments.

Transition to Level 4

Some companies believe that their information end-goal is the completion of an enterprise platform of consistent business intelligence. While that is a true goal from a technology perspective, once that deliverable is turned over to business users, it is only a matter of time before focusing on optimized processes. When this change is driven by external pain (market pressures, financial pressures), the market is already ahead of you.

The steps for moving from Level 3 to Level 4 require expansion from a data focus to one that includes business processes and information interaction. The action items may include:

View the business model as an extended model, including suppliers, customers, and other stakeholders in the view.
Build the ability and culture required to capture tacit (experiential) knowledge as well as explicit quantitative information.
Establish critical enterprise level metrics for all key processes, and run your business by them.
Provide incentives for cooperation, collaboration, and incremental improvement.

Benefits of Moving to Level 4

Level 4 provides additional payoffs for consolidating and integrating enterprise information. This requires building intelligence through new levels of abstraction and new management philosophies, all of which require investment. Organizations moving to Level 4 should look for ROI in these areas:

1) Cost savings through improved efficiency.
2) Lower cycle times for product development and customer acquisition.
3) Improved market penetration through built-in quality.
4) Extending information usage externally to retain customers, suppliers and partners.

More specific characteristics of this level relative to the constituencies may include:

People:
Organization is 100% dependant on information and it is a part of every process
Operations break down if information is turned off
People in this environment are very focused on incremental process improvement and removing unnecessary functions.
Information is a fundamental part of how we do business. Based on this, the skills shift is to business thinking from that of accessing information.
Since information is fundamental, motivation is no longer on using information as it is what we do Functional boundaries are disappearing—silos, communities of interest play a key role Process:
Have the ability to measure knowledge workers work and all processes
Information collected on the information value chain is used to alter processes and the value chain
Analysis used to improve efficiency and productivity of business functions
Information quality is built into processes and measured to ensure levels
Context is provided to understand how decisions impact the value chain
Communities are built into processes
Folks focus on edge-cases and normal things are handled in the value chain through business rules
Can measure contributions of steps towards goals Culture:
Process improvements across elements of the value chain are enabled by communities and sharing of best practices
Acceptance of new work flows and ways of doing business
Enabled to outsource non-core functions based on information Infrastructure:
Need infrastructure in place to leverage multiple types of data in value chain
Need low latency infrastructure frameworks in place to quickly move information around in real-time
Enterprise information system is the backbone of the organization Case A: OurBank Barbara Oglesby reflects on her conversation two years ago with Mr. Snipes, OurBank's CEO. After he approved her plan for an integrated enterprise information environment, he stayed involved in the project of revamping (and in some cases replacing) the departmental datamarts that had sprung up across OurBank. Mr. Snipes gave Barbara plenty of authority as CIO to resolve the many departmental differences, and to establish and enforce enterprise standards and policies relating to information and intelligence.

Barbara had delegated much of the work to her managers and only stepped in when the project team couldn't work out a good solution, one that met the needs of the entire enterprise.

Looking back, it is hard to remember all the work it took to get the first enterprise-wide view of the organization available for everyone to use. But once it was rolled out to the management team, and then to the knowledge workers, the results were astounding. And by tying personal performance criteria to the overall success of the bank, everyone had a stake in making the bank the most productive financial organization in the world. That was the goal, and with the help of 4000 employees focused on goals and metrics that reflected the best customer service, substantial growth in market share, and significant profitability, they were well on the way to being there!

And the ROI was quickly apparent. The first few projects reduced cost or increased efficiency tremendously. And even though the "low hanging fruit" had all been harvested in the first year, they were still gaining incremental improvements using analytical techniques to ferret out inefficiencies. While the incremental improvement "well" might eventually run dry, Barbara was already planning for the next reality . . . establishing a subsidiary that leverages their credit processing and customer call center skills, two facets of their business where they were clearly leaders, as an outsourcing agency for other businesses.

Case B: KidsToys Inc.

Gene Digby remembers back to the end of the project. He had just wrapped up the final deliverable on the enterprise data warehouse project for KidsToys, Inc. They were done, finished, finally!

This project had been a tough one, even for a fifteen year veteran like Gene. But now it was over, and the business users seem happy. He redeployed those members of the development team that they were keeping, and let the consultants and a few staff go.

Gene really never understood what it was they wanted to do with all that information, but, but they wanted it, and they got it. He had to pull back some of they developers when the business people started looking at the information he had supplied, and making changes to what they wanted to see, and how they wanted to see it. This wasn't like most of his projects, which were done when they met the deliverable schedule . . . this one took on a new life after it ended, almost as if delivering the enterprise warehouse had pointed out some things the company was doing wrong!

Well, there had been a flurry of changes right after implementation, not so much in his system itself, but more in the systems that fed information to him. And to people's jobs. He kept hearing in the cafeteria about all the process changes that had resulted from his system. But that had calmed down after a couple of years, and the changes got smaller and smaller. In fact, he had heard that the cost edge they once had was now gone, and their order processing efficiency was falling behind their competitor's. They had already squeezed out gains from the supplier side, and then the distribution channels. Improving customer service had been the last push to gain competitive advantage. Now it looks like they are back at par, or maybe even losing ground to their competitors. Toys are quickly becoming a commodity, and they are running out of ways to cut cost!

Analysis of Cases A and B:

Both OurBank and KidsToys realize that incremental improvements eventually dry out, and that any business can get commoditized when the differentiators disappear.

OurBank, who had saved themselves from possible takeover by getting a grip on their information systems, recognizes early on that they needed to understand their intrinsic value as well as their hard asset value. Using both their knowledge and their capital assets, they have a plan for dealing with the eventuality that banking will be a commodity market.

KidsToys, Inc., on the other hand, is realizing the same thing, but far later in the cycle. Their "best retail toy company" strategy has already disintegrated, and they are just recognizing it. In large part, their strategy failed not because they did not optimize but because KidsToys, Inc., did not properly align itself to the market place. Unlike OurBank, they had no plan in place to create new value streams once their core business model eroded. They continued to seek process improvements, despite the fact that the cost to achieve them began outweighing the benefit. There will need to realize that they are past the point of return on investment . . . that their strategy to seek incremental improvements has decayed. This implies that serious cultural changes will need to take place in order for them to move forward.

Level 5—Innovate

Figure 19A:
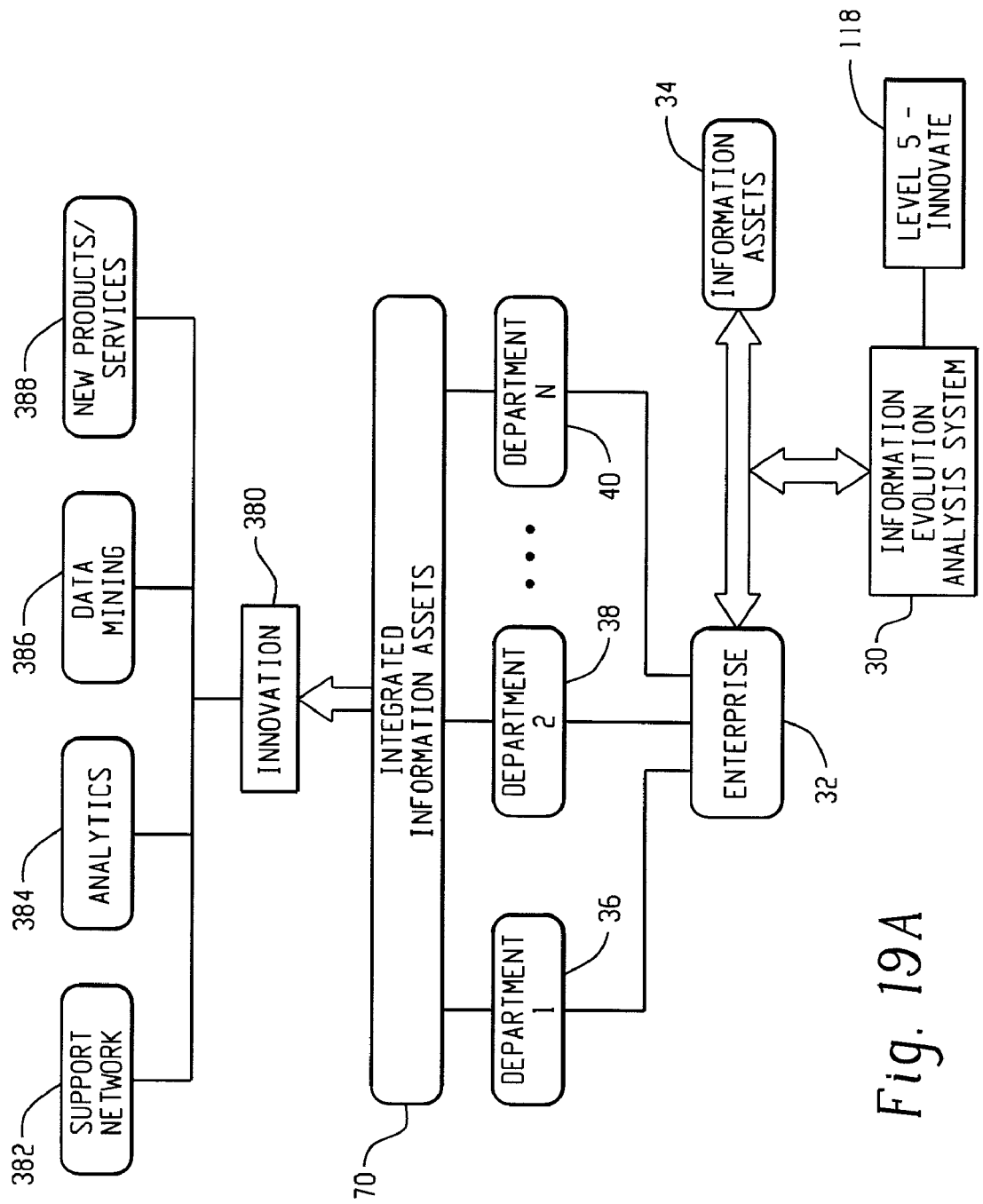
FIGS. 19A and 19B are block diagrams depicting level 5 innovate scenarios of an enterprise.

FIG. 19A illustrates a level 5 innovate analysis depiction of an organization. In Level 5 (118), organizations transition from a process improvement mindset to begin leveraging their knowledge of business, their assets, and their core processes in new ways, introducing truly innovative products and services 388. Once stock is taken of all of a company's assets (both tangible and intangible assets) via enterprise information (as in Level 3), and once optimization becomes the norm (as in Level 4), organizations can leverage core competencies in innovative ways to create new markets, new value propositions and new sources of profit. This is a large payoff for building enterprise intelligence. The entire organization should be committed to this philosophy, as it takes a major paradigm shift, and can result in implementing relatively unknown business models. The organization leverages its quantitative process knowledge-base, utilizes disparate information sources, and embraces institutionalized collaboration to reach far beyond familiar boundaries. Analytics 384 are used extensively to model the future, and to minimize risk associated with new ventures. Like level 4, new business models (this time created by innovation 380) will enable an enterprise to stay ahead of the competition.

The Level 5 environment requires employees, customers, and suppliers, to continuously contribute and evaluate new ideas. The business influence of this activity is enormous. Alignment with enterprise goals is a given, and the organization attracts and rewards individuals who can take advantage of information by discerning, synthesizing and interpreting the wealth of enterprise intelligence presented, in ways that propose new, viable ideas. The Intelligent Enterprise at Level 5 will often look to other industries, technologies and markets for correlating business concepts, and apply them to their business in a way that defines new value.

Data mining processes 386 may be used to find these correlations. Customer satisfaction and behavioral data are analyzed for potential innovation. A project incubation process ensures growth of many new ideas and, the organization undertakes rapid prototyping and development pilots. The ratio of ideas to final implementations is exponential. Hundreds of ideas are tested to find several to pilot, resulting in a few big wins. The organization routinely manages, evaluates, and communicates the results of the innovation incubation process. The focus on managing risk become critical, with the impact on existing processes, technology readiness, potential barriers, and other factors considered in a decision to proceed with any new idea.

Proactive and "revolutionary" cultural change characterizes Level 5. There is an atmosphere of business tension in which competitive and market information constantly stimulates creative thinking and action. Change is fundamental to the organization; it is anticipated, and "out of the box" thinking is normal. Individual creativity, intuition and innovation are supported by a culture of inquiry, cooperation and experience. Identification of communities of individuals with similar interests is automated and based on patterns of use and logical relationships. Collaboration is sophisticated and a culture of innovation accepts that failures are inevitable and they are expected and tolerated as learning experiences—the results of these learning experiences are documented and shared as enterprise knowledge. The sharing of knowledge gained from trial and error experience is important to the overall development of the culture.

There is a support network 382 for creativity that includes systems to organize and foster ideas, address legal processes and manage the design and construction of new products and processes. Technology is applied to access and retrieve information that pertains to topics of interest that might generate innovative ideas. This information includes internal and publicly available external information, in structured and unstructured formats, in a variety of media and languages, and may include databases, text documents, articles, graphics, e-mail, and voice communications. Proposals and pilot projects are documented, categorized and easily accessible for reference and use. Post-pilot reviews are critical learning experiences, and are documented and made available to all who might learn from them.

Figure 19B:
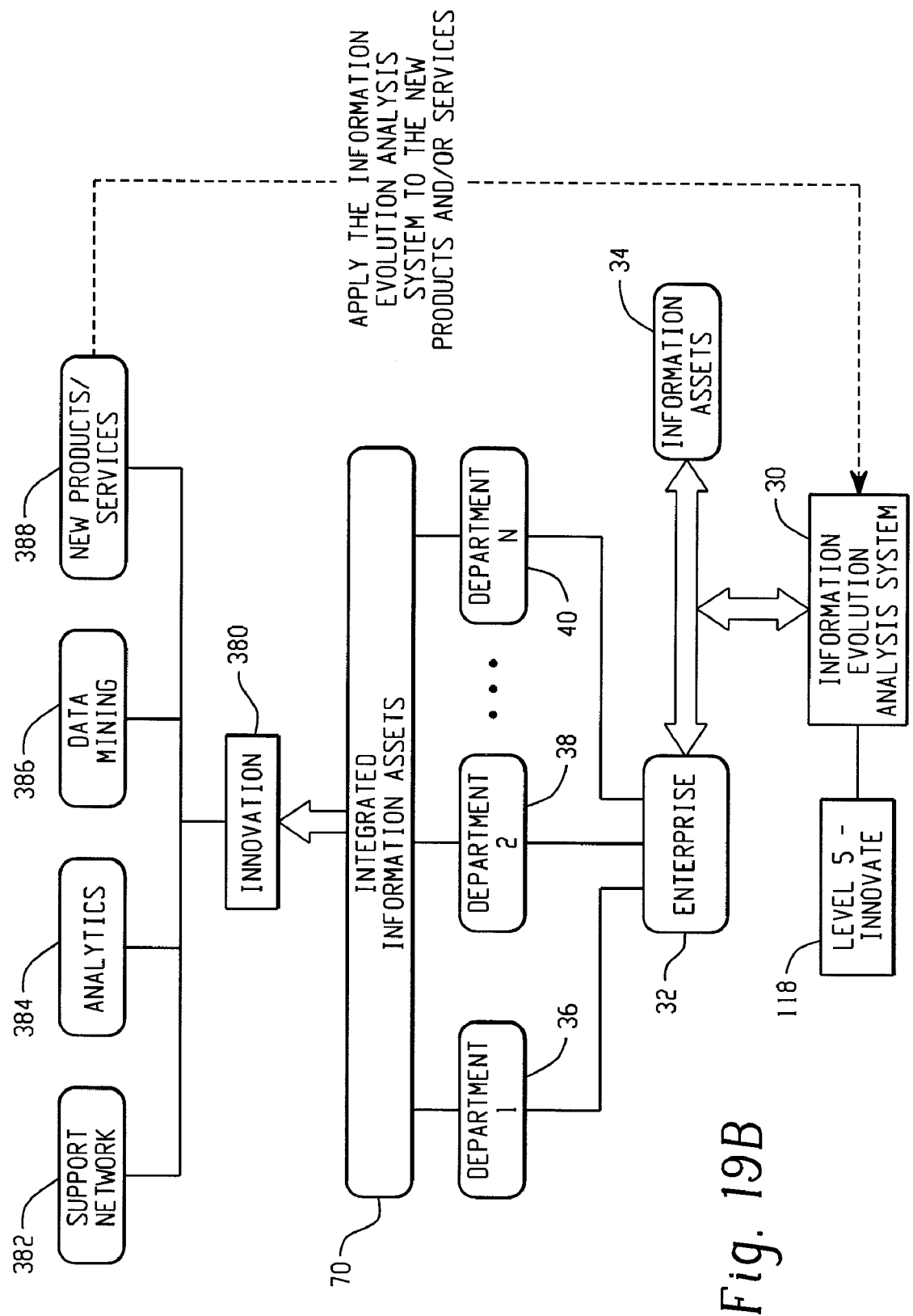

FIG. 19B illustrates that the information evolution analysis system 30 may then be applied to the new products and/or services 388. This ensures that the enterprise 32 and its constituencies are mature or are properly proceeding along the information evolutionary path with respect to the new products and services 388.

Level 5 Key Characteristics

The Level 5 organization institutionalizes innovation in a manner similar to a "think tank." They have a sustainable and managed model for discovering and introducing new products and services for competitive advantage . . . while continuing to align to the market and to optimize internal processes. Organizations can recognize that they are at Level 5 if they have these characteristics:

New ideas can be brought quickly from concept to fruition.
    Employees have access to information from across a wide range of industries and sources.
    Failures with learning are accepted.
    Anyone in the organization can bring a new idea to the table.
    Information is used to forecast and manage new venture risk.

More specific characteristics of this level relative to the constituencies may include:

People:
    Scale of change increases and impacts people greatly
    People are more flexible and agile in their thinking
    Strategic planning is a "daily" process
    Innovation is institutionalized—Think tank
    Hiring people because they are "NOT LIKE US" to bring in new ideas
    People in this environment are very knowledgeable about the company's business, specifically about how the company creates value. They look at other industries, technologies, markets for parallels and analogies that can be applied to their business in a way that defines new value from the existing competencies, human and capital assets
    People have bought into the goals of the company
    Process:
    Strategy decay
    Innovation is rewarded and is encouraged
    Venture capitalist mentality
    Risk management is key—using information forecast and manage risk of change.
    Data mining used to bring out correlations to other businesses, industries with similar issues and challenges.
    New models formed and tested as a routine part of daily analysis
    Need to be able to cross pollinate across organizations
    Culture:
    Change is encouraged and fundamental
    Sustainable innovation
    Business tension
    Culture accepts free thinking, and encourages action on these thoughts.
    Failure is accepted, even expected, with the caveat that the organization should learn from every failure. One of every hundred ideas actually gets to fruition with ROI; It is widely recognized that payback on one winner more than makes up for the investment in 99 other ideas that don't yield profit, but do yield knowledge. Project "incubation" process ensures growth of many new ideas and promotes "winners" to the forefront.
    People are free to team and contribute on projects that interest them, and that yield progress for the project and learning for the employee.
    New hires are often from other industries with a profitable business model in an attempt to encourage cross-pollination of ideas.
    Infrastructure:
    There is a support network for creativity—there are systems in place to catalog and foster ideas through the creative process, through the legal (patent) process, and through design/build processes. There is a systematic way to share knowledge across the organization.
    There are systems in place that scan information sources (industry information) across a wide spectrum of industries that might correlate to the company's business, looking for ideas that might apply.

Transition to Level 5

An intelligent enterprise understands that optimizations have diminishing returns. As companies and their competitors continue to drive inefficiencies out of the system, prices becomes a differentiator. Once the market become price competitive, commoditization follows. The enterprise then may see its profits and growth threatened. When products and services become commodities, new market entrants can deliver similar products at lower cost, thereby lowering everyone's profit margins. In such a competitive market environment, the business strategy of the optimized organization can no longer be sustained. This calls for a totally new approach, one that utilizes information and knowledge for innovation.

Again, it is far better to reach these conclusions before the pain of market commoditization is threatening your existence . . . there needs to be sufficient time to plan and execute a transition. The steps for moving from this level to the next require a significant break with the past, one that emphasizes dramatic changes. The action items may include:

Proactively facilitate and manage the creative process of innovation.
    Value intellectual capital as highly as tangible assets.
    Develop and implement a risk management mentality and infrastructure around your intangible assets (e.g., ideas).
    Implement the ability to scan a variety of information and derive recommendations that direct the company to new opportunities.

Benefits of Moving to Level 5

Where there may be market-induced discomfort, the Level 5 evolution should be justified in these areas:

Generation of higher profit margins from new products and markets.
    Defining new markets that leverage a company's core competencies.
    Upset the playing field for your competitors.
    Market share increase based on sustainable competitive advantage.

Case A: Waterpower, Inc.

Waterpower, Inc., the leading supplier of hydroelectric power in the US, has done a great job over the past five years building an integrated intelligence layer across their enterprise. Having completed the installation of an enterprise information architecture in 1998, they have spent the last three years driving inefficiencies out of their power generation, power distribution, customer service, and supplier interface processes. They are now reaching the point where they can see that large investments are needed to return smaller and smaller returns in efficiency. They are approaching optimum performance. This is important, because the power industry, since deregulation, has been very volatile.

Carl Simmonds has been charged with developing strategies to take Waterpower to the next level of revenue performance. His plan is to tap into the rich cache of ideas that have been developing in Waterpower's innovation pool. This environment encourages all employees to contribute and work on innovations that leverage their own interests and the company's strengths. Waterpower actually funds and staffs those that have been determined to have high potential and develops them as pilot projects. Carl is going to meet with the workgroups on some of these high-potential pilot projects, and choose a couple of new business ideas to move forward as new business ventures for the coming year.

After his meeting, Carl is thrilled with the insights and inventiveness of the teams he talked with. He is now confident that they can roll out two specific initiatives that leverage Waterpower's corporate expertise, core competencies, and make use of corporate assets and knowledge in an exciting new business expansion supporting two key initiatives from the innovation pool. He is about to bring these to the board of directors for approval.

Without the group's thinking, and the ability to realistically model risks associated with projected scenarios by using fact-based data and forecasting processes, the board would never approve piloting his projects. However, Carl is confident that, with board approval, the ideas he is bringing to the table have real potential for turning great profits. By focusing on their core business competencies and thinking about them in a new context, the strategy team has developed two revolutionary concepts, and modeled their success. Carl is excited about their future!

Case B: ElectroSun, Inc.

Brenda Brantly is Chief Operating Officer for ElectroSun, Inc., the largest supplier of solar power in the US. ElectroSun has solar generating stations all across the high plains and southwestern US, and a broad distribution network supplying power to many locations west of the Mississippi.

Under Brenda's leadership, ElectroSun had vastly reduced costs and increased profits by optimizing production and distribution processes over the last five years. Gains in productivity had made them market leaders as their competitors struggled to produce and distribute energy as efficiently and inexpensively as ElectroSun. They had become the darlings of the energy market, with a strong profitability picture. However, over the last couple of years, ROI on process improvement projects have been declining, and the competition has been closing the gap. It seems that the whole industry has reached the same plateau in generating and distribution efficiency that ElectroSun had reached a couple of years ago. ElectroSun no longer had an efficiency advantage.

Brenda was worried about investors. With all the competition catching up, their price leadership strategy was falling apart. They were already starting to see some of their key customers striking new, long-term deals with their competitors with terms that ElectroSun wasn't able to match. If investors start bailing out, stock prices will drop, and her retirement package will diminish.

And now, she has heard through her personal network that one of ElectroSun's biggest rivals, Waterpower, is about to announce two new subsidiaries, one focusing on brokering point-to-point power purchases across the distribution grid, and another to install and manage leased-capacity fiber-optic tele-com lines within their power-grid rights-of-way. What most struck her was that three years ago, Brenda had surfaced the same fiber-optic idea to ElectroSun's board, but the risk seemed too great, and she couldn't prove to the board that it would be profitable. Maybe now that the competitive pressure was on they could start up the project again.

Analysis of Cases A and B:

Both Carl and Brenda see that there is a time when their low-cost producer strategy begins to decay. The differentiator in this example is the level of preparation that Waterpower has taken to be able to mine its enterprise intelligence layer for core competencies, to surface those as strategic differentiators, and to quickly formulate an expansion strategy that is well thought out and proven by statistical modeling. Their ability to do that ahead of their competitors is based on four key components:

- People—Waterpower has identified, retained and nurtured strategic and analytical thinkers. These staff members hold various roles within the organization; yet can be quickly pulled together for strategy sessions as needed.
- Process—Waterpower has defined and supported an innovation-incubation process, and allows staff to surface well-thought-out ideas as a matter of course. In addition, the management team has the ability to promote and support these ideas all the way to the board of directors.
- Culture—Waterpower has a culture that embraces thinking "outside the box"—the only bad idea is the unspoken one. While not all ideas make it to upper management, Waterpower supports independent research and action to prove that an idea has merit.
- Infrastructure—Waterpower has invested wisely in an intelligence architecture that supports their needs today and into the future. As the focus of their core business changes over time, the intelligence architecture is flexible and extensible to meet any integration or expansion challenge they might encounter. They also have a rich suite of analytical capabilities, so that raw ideas can be refined in virtual environments rather than in concrete ones.

Figure 20:
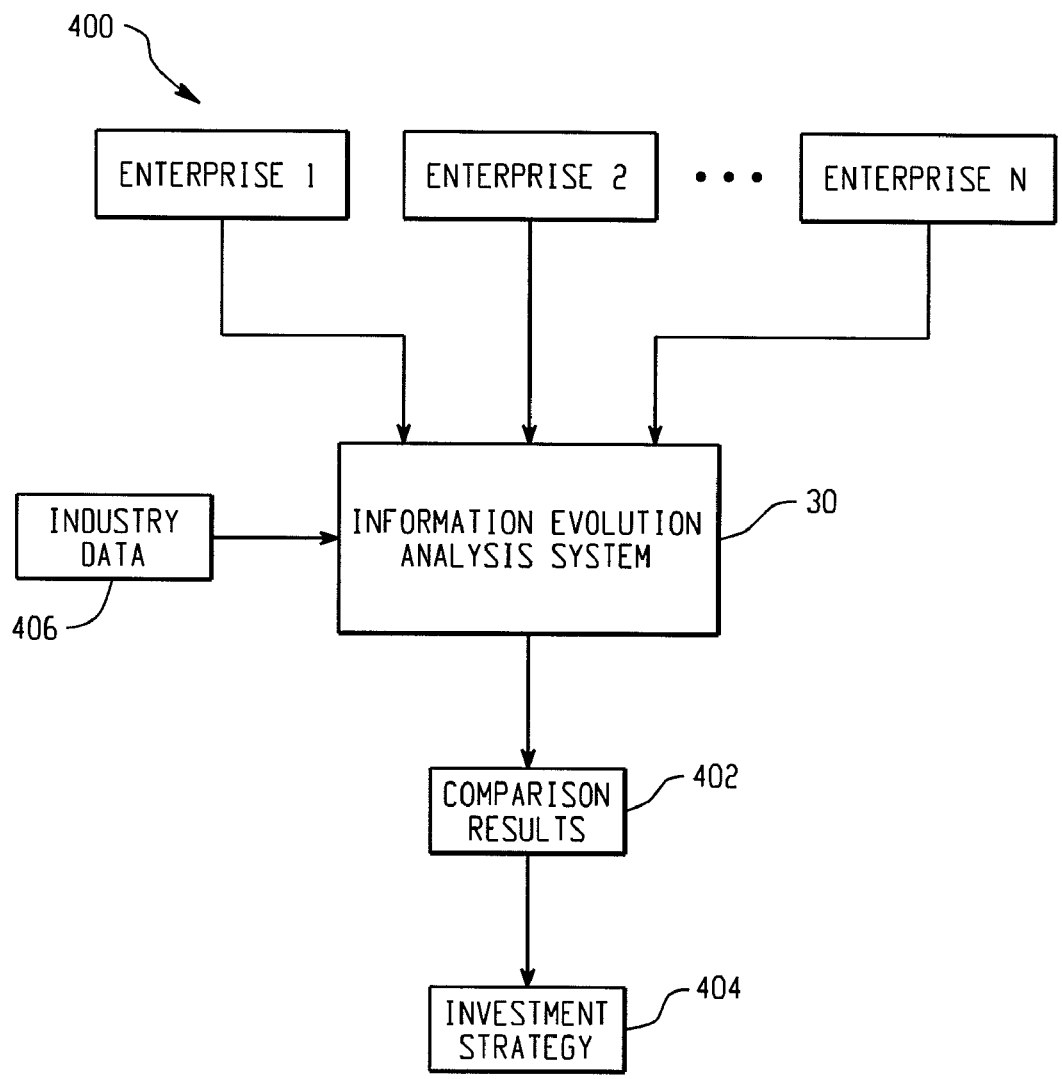
FIG. 20 is a block diagram depicting an exemplary application of the information evolutionary analysis system.

While examples have been used to disclose the invention, including the best mode, and also to enable any person skilled in the art to make and use the invention, the patentable scope of the invention is defined by the claims, and may include other examples that occur to those skilled in the art. For example, FIG. 20 depicts an exemplary application of the information evolutionary analysis system 30. The analysis system 30 may be used to compare multiple enterprises 400, so as to determine in which enterprise to invest (i.e., creation of an investment strategy 404). The evolutionary information model is applied to each of the enterprises 400 under study. The constituencies of each enterprise 400 is accorded a level and a benefit/risk analysis is performed for transitioning the constituencies to the next level. Application of the information evolution model provides comparison results 402, such as ranking as to which enterprises 400 have the highest levels and which enterprises 400 have the highest benefit in progressing to the next level at an acceptable cost. To assist in the latter's determination, industry data 406 may be used to determine accurate costs/benefits for moving an enterprise under study to the next level.

Figure 21:
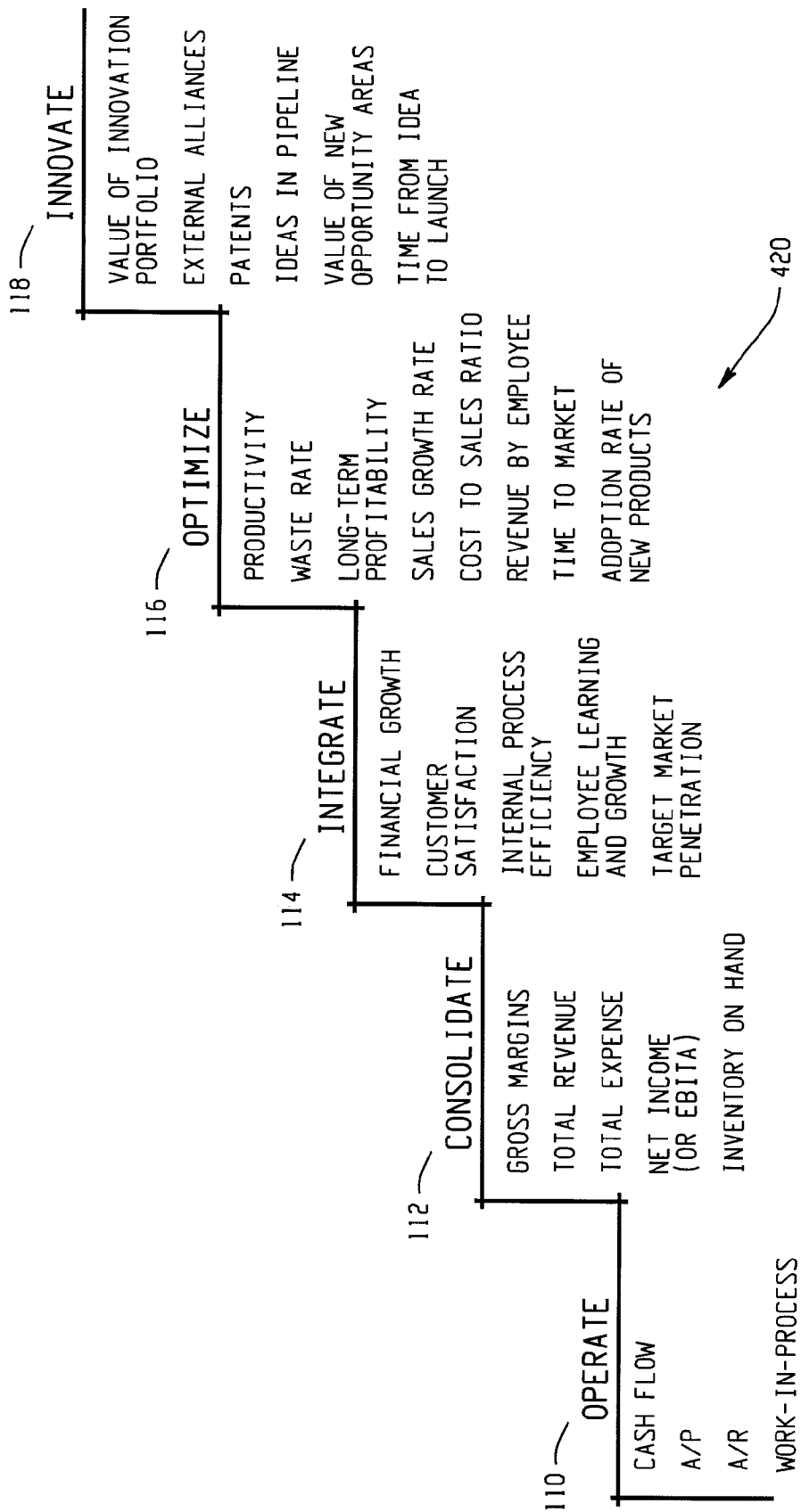
FIG. 21 is a chart depicting exemplary information evolutionary metrics.
Figure 22:
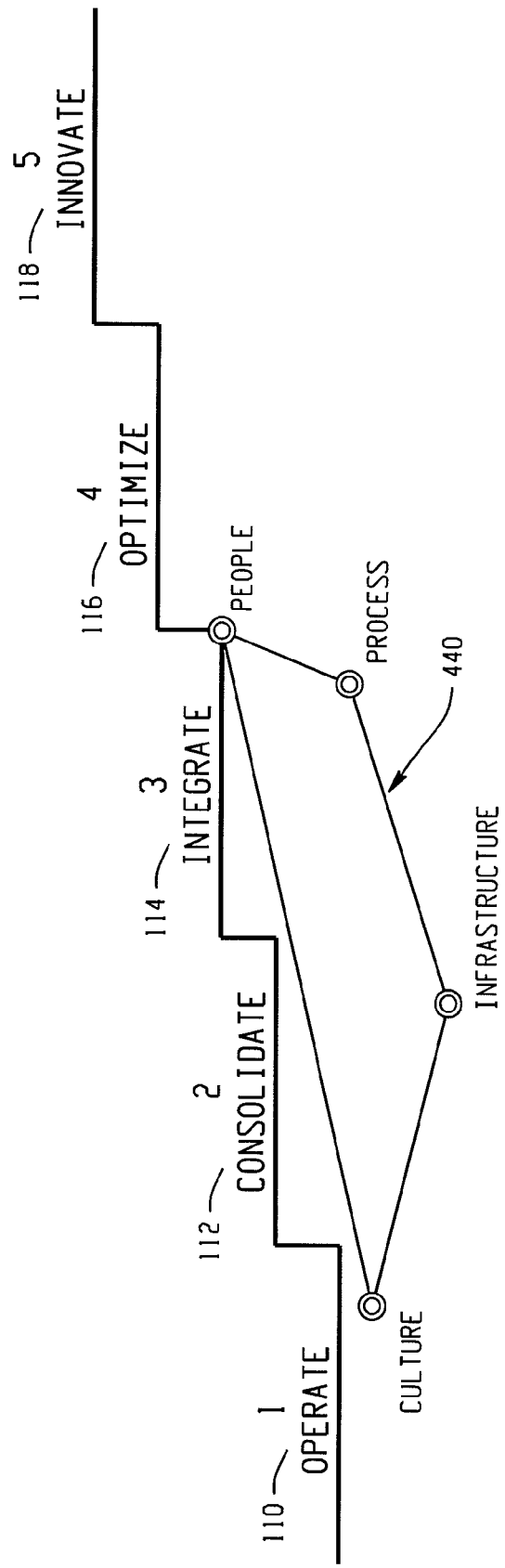
FIG. 22 depicts an alternate graphical analysis technique using the information evolution analysis system.

As yet another example of the many applications and extensions of the system, FIG. 21 depicts exemplary information evolutionary metrics 420 associated with each level (110, 112, 114, 116, 118). The metrics 420 may be used to gauge how successful an enterprise is performing with respect to a level (110, 112, 114, 116, 118). For example, productivity, waste rate, and long-term profitability are metrics which can gauge how successful an enterprise is at the level 4 optimize level (116). Still further, FIG. 22 depicts an alternate graphical analysis technique using the information evolution analysis system. A graph 440 is associated with the five evolutionary levels (110, 112, 114, 116, 118) showing the levels at which each enterprise constituency was rated.

It is claimed as the invention:

1. A system for determining and assisting in an evolution of an organization to higher levels of information utilization maturity, comprising:
   at least one computing device; and
   an analysis system that performs the following operations:
      defining five levels of increasing information utilization maturity within the organization, beginning with level 1, an operate level, which represents the lowest level of information utilization maturity, followed by a progression to level 2, a consolidate level, level 3, an integrate level, level 4, an optimize level, and finally, level 5, an innovate level, which represents the highest level of information utilization maturity;
      collecting a first set of data regarding information distribution and utilization within the organization;
      performing a first impact analysis on the organization based upon the first set of data, wherein the first impact analysis comprises:
         examining the first set of data with respect to the use of information and the evolutionary process in terms of impact on four constituency dimensions of the organization, wherein the four constituency dimensions comprise people, process, culture, and infrastructure; and
         assessing the level to which the organization belongs by comparing the first set of data to a first set of level determination criteria;
      determining that an organization is at an operate level of information utilization maturity based on the first impact analysis;
      identifying one or more action items corresponding to one or more of the four constituency dimensions of the organization demonstrating lower than a consolidate level of information utilization maturity, wherein the one or more action items identify how the organization will progress the one or more constituency dimensions, and therefore the organization as a whole, to the consolidate level of information utilization maturity,
         wherein action items in the progression to the consolidate level comprise at least one of the following:
            (1) developing enterprise and departmental business information requirements, metrics and incentives;
            (2) basing decisions on fact-based analysis, looking for managers who are analytical, and formalizing a Subject Matter Expert (SME) information analysis role;
            (3) sponsoring and managing information projects that support departmental objectives and that can later contribute to an enterprise information environment; and
            (4) developing an information infrastructure (platform, tools, procedures) to support departmental efforts, looking to the future; and
      performing a first risk/benefit analysis on the organization that determines a time period for implementing each of the one or more action items identifying how to progress to the consolidate level;
      wherein the system assists the organization in using the results of the first impact analysis, the one or more action items identifying how to progress to the consolidate level, and the first risk/benefit analysis to progress the organization to the consolidate level;
      collecting a second set of data regarding information distribution and utilization within the organization;
      performing a second impact analysis on the organization based upon the second set of data, wherein the second impact analysis comprises:
         examining the second set of data with respect to the use of information and the evolutionary process in terms of impact on the four constituency dimensions of the organization; and
         assessing the level to which the organization belongs by comparing the second set of data to a second set of level determination criteria;
      determining that an organization is at a consolidate level of information utilization maturity based on the second impact analysis;
      identifying one or more action items corresponding to one or more of the four constituency dimensions of the organization demonstrating lower than an integrate level of information utilization maturity, wherein the one or more action items identify how the organization will progress the one or more constituency dimensions, and therefore the organization as a whole, to the integrate level of information utilization maturity,
         wherein action items in the progression to the integrate level comprise at least one of the following:
            (1) defining enterprise-wide business measures and then running the business by them;
            (2) formalizing efforts to align existing business intelligence efforts to enterprise goals, and to ensure alignment of future efforts;
            (3) defining an enterprise-wide strategy and framework for integrated information management;
            (4) creating incentives for employees to achieve cross-functional results; and
            (5) establishing a governance infrastructure to sustain an integrated information environment;
         and
      performing a second risk/benefit analysis on the organization that determines a time period for implementing each of the one or more action items identifying how to progress to the integrate level;
      wherein the system assists the organization in using the results of the second impact analysis, the one or more action items identifying how to progress to the integrate level, and the second risk/benefit analysis to progress the-organization to the integrate level;
      collecting a third set of data regarding information distribution and utilization within the organization;
      performing a third impact analysis on the organization based upon the third set of data, wherein the third impact analysis comprises:
         examining the third set of data with respect to the use of information and the evolutionary process in terms of impact on the four constituency dimensions of the organization; and
         assessing the level to which the organization belongs by comparing the third set of data to a third set of level determination criteria;

determining that an organization is at a integrate level of information utilization maturity based on the third impact analysis;

identifying one or more action items corresponding to one or more of the four constituency dimensions of the organization demonstrating lower than an optimize level of information utilization maturity, wherein the one or more action items identify how the organization will progress the one or more constituency dimensions, and therefore the organization as a whole, to the optimize level of information utilization maturity, wherein action items in the progression to the optimize level comprise at least one of the following:

(1) viewing a business model as an extended model, including suppliers, customers, and other stakeholders in the view;

(2) building an ability and culture required to capture tacit (experiential) knowledge as well as explicit quantitative information;

(3) establishing critical enterprise level metrics for all key processes, and running business by them; and (4) providing incentives for cooperation, collaboration, and incremental improvement;

and performing a third risk/benefit analysis on the organization that determines a time period for implementing each of the one or more action items identifying how to progress to the optimize level;

wherein the system assists the organization in using the results of the third impact analysis, the one or more action items identifying how to progress to the optimize level, and the third risk/benefit analysis to progress the-organization to the optimize level;

collecting a fourth set of data regarding information distribution and utilization within the organization;

performing a fourth impact analysis on the organization based upon the fourth set of data, wherein the fourth impact analysis comprises:

examining the fourth set of data with respect to the use of information and the evolutionary process in terms of impact on the four constituency dimensions of the organization; and assessing the level to which the organization belongs by comparing the fourth set of data to a fourth set of level determination criteria;

determining that an organization is at an optimize level of information utilization maturity based on the fourth impact analysis;

identifying one or more action items corresponding to one or more of the four constituency dimensions of the organization demonstrating lower than an innovate level of information utilization maturity, wherein the one or more action items identify how the organization will progress the one or more constituency dimensions, and therefore the organization as a whole, to the innovate level of information utilization maturity, wherein action items in the progression to the innovate level comprise at least one of the following:

(1) proactively facilitating and managing the creative process of innovation;

(2) valuing intellectual capital as highly as tangible assets;

(3) developing and implementing a risk management mentality and infrastructure around your intangible assets; and (4) implementing the ability to scan a variety of information and derive recommendations that direct the company to new opportunities;

and performing a fourth risk/benefit analysis on the organization that determines a time period for implementing each of the one or more action items identifying how to progress to the innovate level;

wherein the system assists the organization in using the results of the fourth impact analysis, the one or more action items identifying how to progress to the innovate level, and the fourth risk/benefit analysis to progress the organization to the innovate level;

wherein each of the sets of level determination criteria are based upon what entity controls information assets within the organization and how the information assets are distributed across the departments of the organization, wherein the organization is assessed as belonging to a particular level only when all constituency dimensions of the organization at least meet the level determination criteria corresponding to that particular level; and wherein the system assists the organization in improving the distribution and utilization of the information assets across the organization.

2. The system of claim 1, wherein transitions between levels provides greater strategic value with respect to the information assets of the organization.

3. The system of claim 1, wherein the organization is a company.

4. The system of claim 1, wherein the organization is an enterprise.

5. The system of claim 1, wherein the organization is directed to digital delivery of entertainment and news to customers through an internet network.

6. The system of claim 1, wherein the organization is directed to interactive web content delivery or streaming video delivery to customers through an internet network.

7. The system of claim 1, wherein each transition between levels represents an increase in information maturity for the organization.

8. The system of claim 1, wherein each level includes corresponding capabilities, and wherein the progression through the levels causes the organization capabilities to build cumulatively from each level to the next.

9. The system of claim 1, wherein the optimize level includes an alignment of products and services of the organization with market considerations before the processes of the organization are optimized.

10. The system of claim 1, wherein each identification of the one or more action items facilitates the progression between levels.

11. The system of claim 1, wherein the combination of the five generated levels comprises an information evolutionary model that is used to analyze a plurality of organizations, and provide a ranking of the organizations with respect to information evolutionary maturity.

* * * * *